(12) United States Patent
Brochu et al.

(10) Patent No.: US 8,150,552 B2
(45) Date of Patent: Apr. 3, 2012

(54) METHOD, DEVICE AND SYSTEM FOR USE IN CONFIGURING A BATHING UNIT CONTROLLER

(75) Inventors: Christian Brochu, Quebec (CA); Mathleu Robitaille, Neuville (CA)

(73) Assignee: Gecko Alliance Group Inc., Quebec, Quebec (CA)

( * ) Notice: Subject to any disclaimer, the term of this patent is extended or adjusted under 35 U.S.C. 154(b) by 321 days.

(21) Appl. No.: 12/528,256

(22) PCT Filed: Feb. 25, 2008

(86) PCT No.: PCT/CA2008/000352
§ 371 (c)(1),
(2), (4) Date: Aug. 21, 2009

(87) PCT Pub. No.: WO2008/104056
PCT Pub. Date: Sep. 4, 2008

(65) Prior Publication Data
US 2011/0046796 A1 Feb. 24, 2011

Related U.S. Application Data

(60) Provisional application No. 60/891,657, filed on Feb. 26, 2007.

(51) Int. Cl.
*G06F 19/00* (2011.01)
(52) U.S. Cl. .............................. 700/282; 422/65; 422/67
(58) Field of Classification Search .................. 700/282; 422/65, 67
See application file for complete search history.

(56) References Cited

U.S. PATENT DOCUMENTS

| | | | |
|---|---|---|---|
| 5,710,409 A | 1/1998 | Schwarzbäcker et al. | |
| 5,772,963 A * | 6/1998 | Cantatore et al. | 422/67 |
| 5,930,852 A | 8/1999 | Gravatt et al. | |
| 5,988,857 A * | 11/1999 | Ozawa et al. | 700/213 |
| 6,200,108 B1 | 3/2001 | Caudill et al. | |
| 6,355,913 B1 | 3/2002 | Authier et al. | |
| 6,444,171 B1 * | 9/2002 | Sakazume et al. | 422/65 |
| 6,476,363 B1 | 11/2002 | Authier et al. | |
| 6,488,408 B1 | 12/2002 | Laflamme et al. | |
| 6,717,050 B2 | 4/2004 | Laflamme et al. | |
| 6,744,223 B2 | 6/2004 | Laflamme et al. | |

(Continued)

FOREIGN PATENT DOCUMENTS

CA 2430862 C 11/2007

(Continued)

OTHER PUBLICATIONS

"Comparing JTAG, SPI, and I2C" Application Note by Russell Hanabusa, Apr. 13, 2007.*

(Continued)

*Primary Examiner* — Michael D Masinick

(57) ABSTRACT

A controller for a bathing unit system comprising a memory unit for storing program instructions, an interface for establishing a communication link with an external memory medium and a processing unit. The controller is operative for controlling a set of bathing unit components at least in part on the basis of the program instructions stored in the memory unit. The external memory medium stores update information associated with the program instructions and relevancy information indicative of a characteristic of the update information. The processing unit is operative for detecting the presence of an external memory medium at the interface, accessing the relevancy information stored in the memory medium, processing the relevancy information and causing the program instructions to be updated on the basis of the update information.

30 Claims, 10 Drawing Sheets

U.S. PATENT DOCUMENTS

| | | | |
|---|---|---|---|
| 6,780,617 B2* | 8/2004 | Chen | 435/91.2 |
| 6,782,309 B2 | 8/2004 | Laflamme et al. | |
| 6,813,575 B2 | 11/2004 | Laflamme | |
| 6,874,175 B2 | 4/2005 | Laflamme et al. | |
| 6,900,736 B2 | 5/2005 | Crumb | |
| 6,929,516 B2 | 8/2005 | Brochu et al. | |
| 6,942,354 B2 | 9/2005 | Metayer et al. | |
| 6,976,052 B2 | 12/2005 | Tompkins et al. | |
| 7,112,768 B2 | 9/2006 | Brochu et al. | |
| 7,327,275 B2 | 2/2008 | Brochu et al. | |
| 7,419,406 B2 | 9/2008 | Brochu et al. | |
| 7,440,829 B2 | 10/2008 | Hara | |
| 7,489,986 B1 | 2/2009 | Laflamme et al. | |
| 7,593,789 B2 | 9/2009 | Gougerot et al. | |
| 7,619,181 B2 | 11/2009 | Authier | |
| 7,701,679 B2 | 4/2010 | Brochu et al. | |
| 7,788,669 B2* | 8/2010 | England et al. | 718/104 |
| 7,843,357 B2 | 11/2010 | Brochu et al. | |
| 7,982,625 B2 | 7/2011 | Brochu et al. | |
| 2002/0035403 A1 | 3/2002 | Clark et al. | |
| 2004/0230794 A1* | 11/2004 | England et al. | 713/164 |
| 2005/0040250 A1* | 2/2005 | Wruck | 236/51 |
| 2005/0063123 A1 | 3/2005 | Cline et al. | |
| 2005/0168902 A1 | 8/2005 | Laflamme et al. | |
| 2005/0228544 A1 | 10/2005 | Bauer et al. | |
| 2005/0240919 A1 | 10/2005 | Kim et al. | |
| 2006/0277330 A1* | 12/2006 | Diepstraten et al. | 710/40 |
| 2009/0011417 A1* | 1/2009 | Maltezos et al. | 435/6 |

FOREIGN PATENT DOCUMENTS

| | | |
|---|---|---|
| CA | 2324598 C | 5/2008 |
| CA | 2483876 C | 4/2009 |
| CA | 2349106 C | 10/2009 |
| CA | 2442861 C | 12/2009 |
| CA | 2521572 C | 12/2009 |
| CA | 2361096 C | 3/2011 |
| CA | 2467015 C | 7/2011 |
| EP | 1 588 685 A1 | 10/2005 |
| EP | 1 653 366 A1 | 5/2006 |

OTHER PUBLICATIONS

International Search Report mailed on Jun. 6, 2008 in connection with corresponding International Patent Application No. PCT/CA2008/000352.

Written Opinion of the International Searching Authority mailed on Jun. 6, 2008 in connection with corresponding International Patent Application No. PCT/CA2008/000352.

Extended European Search Report issued by the European Patent Office on Nov. 28, 2011 in connection with European Patent Application No. 08 714 674.2, 7 pages.

International Preliminary Report on Patentability issued on Aug. 26, 2009 by the International Bureau of WIPO in connection with International Patent Application Serial No. PCT/CA2008/000352, 7 pages.

* cited by examiner

METHOD, DEVICE AND SYSTEM FOR USE IN CONFIGURING A BATHING UNIT CONTROLLER

CROSS REFERENCE TO RELATED APPLICATIONS

This application claims the benefit under 35 USC §119(e) of U.S. provisional patent application Ser. No. 60/891,657 filed Feb. 26, 2007 by Christian Brochu et al. and presently pending. The contents of the above-mentioned patent application are incorporated herein by reference.

FIELD OF THE INVENTION

The present invention relates generally to the field of bathing unit systems, and more particularly to a method, device and system for updating and configuring bathing unit controllers on the basis of information contained on an external memory medium.

BACKGROUND OF THE INVENTION

Control systems for bathing unit systems such as spas, whirlpools, hot tubs, bathtubs, therapeutic baths and swimming pools, are well known in the art. Typically, such control systems are operative for controlling the various functional components of the bathing unit systems, which include water pumps, heating modules, filter systems, air blowers, ozone generators, and lighting systems, among others.

In general, bathing unit control systems include a controller to which the various bathing unit components are connected. This controller is operative for controlling the power supplied from a power source to each one of the various components. In addition, the controller is operative for controlling the various operational settings of the different components on the basis of control logic stored at the controller or on the basis of inputs from a user of the bathing unit system.

During the lifetime of a bathing unit system, it is possible that a user/owner may add or change bathing unit components that are used with the bathing unit system. For example, a user/owner may wish to add multi-media equipment such as a CD player, or a DVD player to the bathing unit system. Or alternatively, a user/owner may wish to replace an old water pump with a new, more powerful, water pump. Whenever a user makes an addition, or changes the bathing unit components, the data and/or program instructions within the controller may need to be updated or re-configured, such that the controller can control the operational settings of the one or more new components.

Traditionally, in order to re-configure, or update the functionality of the bathing unit controller, the bathing unit controller would need to be removed from the bathing unit system and sent to a manufacturer or maintenance center, such that the updating or reconfiguring operations would be performed at the manufacturer or maintenance center. Alternatively, the manufacturer or maintenance center would send a worker to the premises of the bathing unit controller, such that the worker could then use specialized equipment to update or configure the controller.

In either of the above cases, the process of updating or configuring the bathing unit controller is inconvenient and expensive for both the owner/user of the bathing unit system, and for the manufacturer or maintenance center. In light of the above, it can be seen that there is a need in the industry for a method, system and device that is able to alleviate, at least in part, the deficiencies associated with the traditional methods of updating and configuring a bathing unit system.

SUMMARY OF THE INVENTION

In accordance with a first broad aspect, the present invention provides a controller for a bathing unit system. The controller comprises a memory unit, an interface and a processing unit. The memory unit stores program instructions. The controller being operative to control a set of bathing unit components at least in part on the basis of the program instructions. The interface being operative for establishing a communication link with an external memory medium. The external memory medium stores update information associated with the program instructions, and relevancy information indicative of a characteristic of the update information. The processing unit is in communication with the memory unit and the interface, such that the processing unit is operative for detecting the presence of an external memory medium at the interface, accessing the relevancy information stored in the memory medium, processing the relevancy information to determine whether the update information stored on the external memory medium should be applied to the program instructions and upon determination that the update information should be applied to the program instructions, causing the program instructions to be updated on the basis of the update information.

In accordance with a second broad aspect, the present invention provides an apparatus suitable for use with a controller of a bathing unit system. The controller is operative for controlling a set of bathing unit components at least in part on the basis of program instructions stored in an internal memory. The apparatus comprises an interface for establishing a communication link with the bathing unit controller, and a memory component. The memory component storing update information associated with the program instructions and relevancy information indicative of a characteristic of the update information. The apparatus being responsive to a signal from the controller for releasing over the communication link the relevancy information. The relevancy information allowing the controller to determine whether to cause the program instructions to be updated on the basis of the update information.

In accordance with a third broad aspect, the present invention provides a bathing unit system, comprising a set of bathing unit components, an external memory medium and a controller. The external memory medium stores update information and relevancy information indicative of a characteristic of the update information. The controller comprises an internal memory unit for storing program instructions such that the controller can control the set of bathing unit components at least in part on the basis of the program instructions. The controller further comprising an interface for establishing a communication link with the external memory medium and a processing unit in communication with the memory unit and the interface. The processing unit being operative for detecting the presence of the external memory medium at the interface, accessing the relevancy information stored at the memory medium, processing the relevancy information to determine whether the update information should be applied to the program instructions and upon determination that the update information should be applied to the program instructions, causing the program instructions to be updated on the basis of the update information.

In accordance with a fourth broad aspect, the present invention provides a method for updating program instructions at a controller of a bathing unit system. The controller is operative for controlling a set of bathing unit components at least in part on the basis of the program instructions. The method comprising establishing a communication link between an external memory medium and the controller. The external memory medium comprising update information associated with the program instructions and relevancy information indicative of at least one characteristic of the update information. The method further comprises processing the relevancy information at the controller to determine whether the update information should be applied to the program instructions and upon determination by the controller that the update information should be applied to the program instructions, causing the program instructions at the controller to be updated on the basis of the update information stored on the external memory medium.

In accordance with a fifth broad aspect, the present invention provides a method for updating program instructions at a controller of a bathing unit system. The controller is operative for controlling a set of bathing unit components at least in part on the basis of the program instructions. The method comprises providing an external memory medium comprising update information associated with the program instructions and relevancy information indicative of a characteristic of the update information. The method further comprises providing instructions for enabling a user to establish a communication link between the external memory medium and the controller. The controller being operative for detecting the presence of a communication link with the external memory medium, processing the relevancy information to determine whether the update information should be applied to the program instructions and upon determination that the update information should be applied to the program instructions, causing the program instructions to be updated on the basis of the update information.

In accordance with a sixth broad aspect, the present invention provides a controller for a bathing unit system. The controller is suitable for controlling a set of bathing unit components. The controller comprises a memory unit, an interface and a processing unit. The memory unit comprising at least a first set of program instructions and a second set of program instructions. The implementation of the first set of program instructions being suitable for causing the controller to acquire a first configuration, and the implementation of the second set of program instructions being suitable for causing the controller to acquire a second configuration. The interface is suitable for establishing a communication link with an external memory medium that stores configuration information. The processing unit is in communication with the interface, and is operative for detecting the presence of the external memory medium at the interface, accessing the configuration information stored in the external memory medium and processing the configuration information for causing the controller to acquire one of the first configuration and the second configuration based on the configuration information.

In accordance with a seventh broad aspect, the present invention provides a bathing unit system, comprising a set of bathing unit components, an external memory medium storing configuration information and a controller. The controller comprises a memory unit comprising at least a first set of program instructions and a second set of program instructions. The implementation of the first set of program instructions being suitable for causing the controller to acquire a first configuration, and the implementation of the second set of program instructions being suitable for causing the controller to acquire a second configuration. The controller further comprising an interface for establishing a communication link with an external memory medium and a processing unit in communication with the interface. The processing unit is operative for detecting the presence of the external memory medium at the interface, accessing the configuration information stored in the external memory medium and processing the configuration information for causing the controller to acquire one of the first configuration and the second configuration based on the configuration information.

In accordance with a eighth broad aspect, the present invention provides an apparatus suitable for use with a controller of a bathing unit system. The controller comprises a memory unit that stores at least a first set of program instructions and a second set of program instructions. The implementation of the first set of program instructions is suitable for causing the controller to acquire a first configuration, and the implementation of the second set of program instructions is suitable for causing the controller to acquire a second configuration. The apparatus comprises an interface for establishing a communication link with the controller of the bathing unit system and a memory component for storing configuration information. The apparatus is responsive to a signal from the controller for releasing over the communication link the configuration information. The configuration information causes the controller to acquire one of the first configuration and the second configuration based on the configuration information.

In accordance with a ninth broad aspect, the present invention provides a method for configuring a controller for a bathing unit system. The controller comprises a memory unit that stores at least a first set of program instructions and a second set of program instructions. The implementation of the first set of program instructions is suitable for causing the controller to acquire a first configuration, and the implementation of the second set of program instructions is suitable for causing the controller to acquire a second configuration. The method comprising establishing a communication link between an external memory medium that stores configuration information and processing the configuration information at the controller for causing the controller to acquire one of the first configuration and the second configuration based on the configuration information.

In accordance with a tenth broad aspect, the present invention provides a controller for a bathing unit system. The controller being suitable for controlling a set of bathing unit components. The controller comprising a memory unit for storing an initial set of program instructions and an interface for establishing a communication link with an external memory medium. The external memory medium stores configuration information that comprises a set of program instructions. The set of program instructions is suitable for causing the controller to acquire a certain configuration. The controller further comprising a processing unit in communication with the interface. The processing unit being operative for detecting the presence of the external memory medium at the interface, accessing the configuration information stored in the external memory medium at least in part on the basis of the initial program instructions and processing the configuration information for causing the controller to implement the set of program instructions for causing the controller to acquire the certain configuration.

In accordance with a eleventh broad aspect, the present invention provides a bathing unit system comprising a set of bathing unit components, an external memory medium for storing configuration information comprising a set of program instructions and a controller. The controller is suitable for controlling the set of bathing unit components and comprises a memory unit for storing an initial set of program instructions, an interface for establishing a communication link with the external memory medium and a processing unit in communication with the interface. The processing unit is operative for detecting the presence of the external memory medium at the interface, accessing the configuration information stored in the external memory medium at least in part on the basis of the initial program instructions and processing the configuration information for causing the controller to implement the set of program instructions for causing the controller to acquire the certain configuration.

In accordance with a twelfth broad aspect, the present invention provides an apparatus suitable for use with a controller of a bathing unit system. The controller comprising a memory unit that stores an initial set of program instructions. The apparatus comprises an interface for establishing a communication link with the controller of the bathing unit system and a memory component for storing configuration information that comprises a set of program instructions. The set of program instructions is suitable for causing the controller to acquire a certain configuration. The apparatus is responsive to a signal from the controller for releasing over the communication link the configuration information. The configuration information causing the controller to acquire the certain configuration.

In accordance with a thirteenth broad aspect, the present invention provides a method for configuring a controller for a bathing unit system. The controller comprises a memory unit that stores an initial set of program instructions. The method comprises establishing a communication link between an external memory medium and the controller. The external memory medium stores configuration information that comprises a set of program instructions for causing the controller to acquire a certain configuration. The method further comprises processing the configuration information at the controller for causing the controller to acquire the certain configuration.

In accordance with a fourteenth broad aspect, the present invention provides a controller for controlling a set of bathing unit components in a bathing unit system. The controller comprises an interface for establishing a communication link with an external memory medium and a processing unit in communication with the memory unit and the interface. The processing unit is operative for detecting the presence of the external memory medium at the interface and upon detection of the presence of the external memory medium at the interface, causing diagnostic information associated with the operation of the set of bathing unit components to be released to the external memory medium over the communication link.

In accordance with a fifteenth broad aspect, the present invention provides a system for logging diagnostic information associated with the control of a set of bathing unit components. The system comprises a set of bathing unit components, an external memory medium and a controller for controlling the set of bathing unit components. The controller comprises an internal memory containing initial program instructions, an interface for establishing a communication link with the external memory medium and a processing unit in communication with the interface. The processing unit is operative for detecting the presence of the external memory medium at the interface at least in part on the basis of the initial program instructions, and upon detection of the presence of the external memory medium at the interface, causing diagnostic information associated with the operation of the set of bathing unit components to be released to the external memory medium over the communication link.

In accordance with a sixteenth broad aspect, the present invention provides a method for providing diagnostic information associated with the control of a set of bathing unit components in a bathing unit system. The method comprises establishing a communication link between an external memory medium and a controller and upon detection at the controller of the presence of the external memory medium, causing diagnostic information associated with the operation of the set of bathing unit components to be released to the external memory medium over the communication link.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION

The description below is directed to a specific implementation of the invention in which the invention is used in a bathing unit system. It is to be understood that the terms "bathing unit" and "bathing unit system", as used for the purposes of the present description, refers to spas, whirlpools, hot tubs, bathtubs, therapeutic baths, swimming pools and any other type of water receptacle that can be equipped with a control system for controlling various operational settings.

Figure 1:
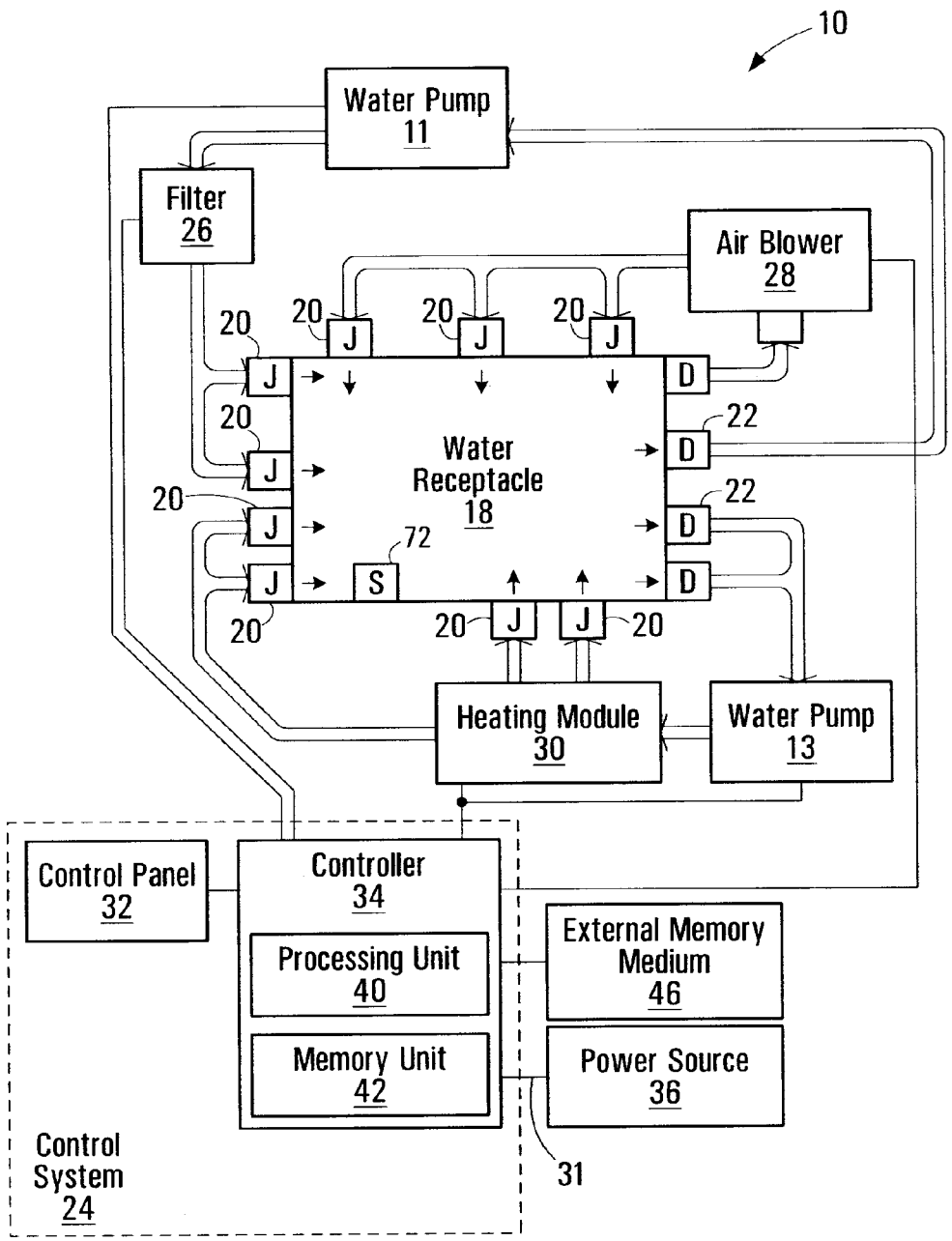
FIG. 1 shows a functional block diagram of a bathing unit system in accordance with a non-limiting example of implementation of the present invention.

FIG. 1 illustrates a block diagram of a bathing unit system 10 in accordance with a specific example of implementation of the present invention. The bathing unit system 10 includes a water receptacle 18 for holding water, a plurality of jets 20, a set of drains 22 and a control system 24. In the specific embodiment shown in FIG. 1, the bathing unit system 10 further includes a set of bathing unit components that includes a heating module 30, two water pumps 11 and 13, a filter 26 and an air blower 28. It should be understood that the bathing unit system 10 could include more or less bathing unit components without departing from the spirit of the invention. For example, although not shown in FIG. 1, the bathing unit system 10 could include an ozonator, a lighting system for lighting up the water in the receptacle 18, multimedia devices such as a CD/DVD player and any other suitable device.

In the non-limiting embodiment shown, the control system 24 includes a controller 34 for controlling the set of bathing unit components 11, 13, 26, 28, 30 and a control panel 32 for enabling a user to enter user commands to the controller 34. The control panel 32 is typically in the form of a user interface that allows a user to enter commands for causing the controller 34 to control the various operational settings of the bathing unit components. Some non-limiting examples of operational settings include temperature control settings, jet control settings, and lighting settings. In a non-limiting embodiment where the bathing unit is connected to entertainment and/or multimedia modules, the operational settings of the bathing unit may also include audio settings and video settings, amongst others. Consequently, the expression "operational settings", for the purpose of the present invention, is intended to cover operational settings for any suitable equipment that can be operated by a user of the bathing unit system.

The control system 24 receives electrical power from an electric power source 36 that is connected to the controller 34 via service wiring 31. The power source 36 supplies the controller 34 with any conventional power service suitable for residential or commercial use. The controller 34 then controls the distribution of power supplied to the various bathing unit components on the basis of program instructions and signals received from the control panel 32 in order to cause the desired operational settings to be implemented.

In a non-limiting implementation, the power source 36 can supply 240 volts (V) AC to the controller 34 via service wiring 31. In an alternative non-limiting implementation, the power source 36 can supply 120 volts (V) AC to the controller 34 via service wiring 31. In yet a further alternative non-limiting implementation, the power source 36 can supply 120 Volts and 240 Volts AC to the controller 34 via service wiring 31. It is to be appreciated that other voltage supply values or voltage supply combinations, for example depending on geographical location, are possible without detracting from the spirit and scope of the invention. In a non-limiting implementation, the service wiring 31 is passed through a ground fault circuit interrupter (GFCI) that is adapted for tripping in the presence of a current leakage to the ground. The ground fault circuit interrupter (GFCI) provides an added safety measure to the bathing unit system.

In normal operation, water flows from the bathing unit receptacle 18, through the drains 22 and is pumped by water pump 13 through the heating module 30 where the water is heated. The heated water then leaves the heating module 30 and re-enters the bathing unit receptacle 18 through jets 20. In addition, water flows from the bathing unit receptacle 18, through different drains 22 and is pumped by water pump 11 through filter 26. The filtered water then re-enters the bathing unit receptacle 18 through different jets 20. Water can flow through these two cycles continuously while the bathing unit system 10 is in operation. Optionally, water can also flow from the bathing unit receptacle 18 through one or more drains 22 to an air blower 28 that is operative for delivering air bubbles to water that re-enters the bathing unit receptacle 18 through jets 20.

As shown in FIG. 1, the controller 34 includes a processing unit 40 and a memory unit 42 that are in communication with one another over a communication bus. The processing unit 40 is operative for accessing and processing program instructions stored within the memory unit 42 for enabling the controller 34 to control the set of bathing unit components 11, 13, 26, 28 and 30 at least in part on the basis of those program instructions.

Figure 2:
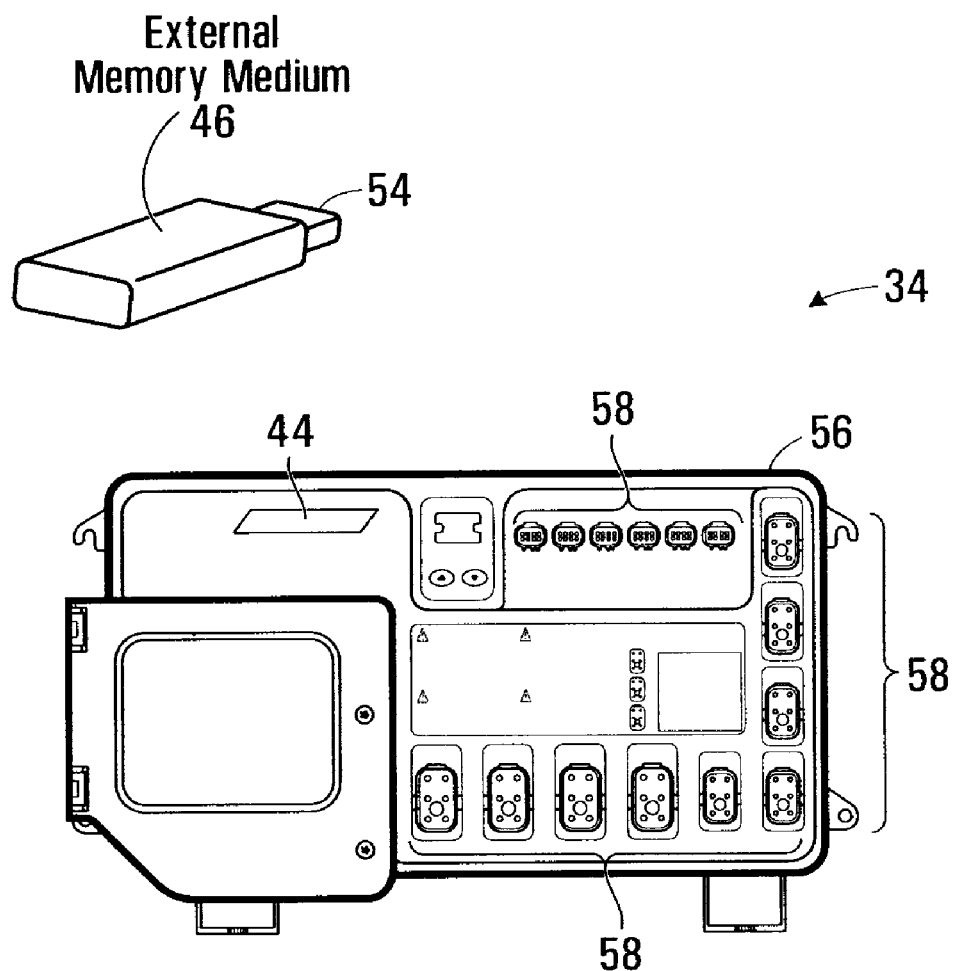
FIG. 2 shows a physical representation of an external memory medium and a bathing unit controller in accordance with a non-limiting example of implementation of the present invention.

Shown in FIG. 2, is a non-limiting example of an external structure for the controller 34 in accordance with the present invention. As shown, the controller 34 includes a housing 56 for enclosing electrical circuitry, including the processing unit 40 and the memory unit 42 (not shown). The housing 56 further includes a plurality of bathing unit component interfaces 58 for receiving corresponding connectors from respective ones of the bathing unit components 11, 13, 26, 28 and 30 for enabling power and control signals to be issued to the bathing unit components 11, 13, 26, 28 and 30 from the controller 34. The housing 56 further includes an interface 44 for establishing a communication link with an external memory medium 46. In the non-limiting embodiment shown, the interface 44 is a female USB connection port suitable for receiving a corresponding male USB connector from the external memory medium 46. Alternatively, the interface 44 could be any other type of physical interface known in the art, such as an I2C or an SPI connection port suitable for receiving a corresponding I2C or SPI connector from the external memory medium 46. It should, however, be appreciated that instead of being a physical connection port, the interface 44 could be any other type of interface, such as an infrared port or an RF transceiver, without departing from the spirit of the invention.

As shown in FIG. 2, the external memory medium 46 also includes an interface 54 for enabling the external memory medium 46 to establish the communication link with the controller 34. In the non-limiting embodiment shown, the interface 54 is a male USB connector for connecting with the female USB connector 44 on the controller 34. It should be appreciated that the interface 54 could be any other type of interface, such as a corresponding I2C or SPI connector, an infrared port or an RF transceiver, without departing from the spirit of the invention. Obviously, in order for the interface 54 on the external memory medium 46 to establish a communication link with the interface 44 on the controller 34, the two types of interfaces 44 and 54 should be compatible. Based on the above, it can be appreciated that the communication link between the controller 34 and the external memory medium 46 can be either a physical wireline link, an RF link or an infrared link.

It should also be appreciated that the interface 54 on the external memory medium 46 may be operative for connecting/interfacing directly with the interface 44 on the controller 34, or alternatively may be operative for connecting to an adapter that is, in turn, suitable for connecting with the interface 44. In this manner, the communication link between the external memory medium 46 and the controller 34 travels through an adapter (not shown).

In accordance with the non-limiting example shown in FIG. 2, the external memory medium 46 is a portable memory key (otherwise known as a memory wand, a memory stick or a USB key). Although the memory medium 46 shown in FIG. 2 is a memory key, it should be understood that the external memory medium 46 could be any suitable type of external memory medium capable of storing the type of information that will be described in more detail below. For example, the external memory medium could be a hard drive of a personal computer, a CD or DVD, a PDA, a cell phone, or any other suitable type of external memory medium.

As described above, the controller 34 is operative to establish a communication link with an external memory medium 46 through interface 44 for enabling the controller 34 to receive information from, and/or transmit information to, the external memory medium 46. As will be described in more detail below, for the purposes of the present invention, the external memory medium 46 can be used for one or more of the following purposes:

- to provide update information to the controller 34 for enabling the controller to update data and/or program instructions stored in its memory unit 42,
- to provide configuration information to the controller 34 for configuring the functionality of the controller 34; and/or
- to provide diagnostic information associated with the operation of the controller 34 and/or set of bathing unit components 11, 13, 26, 28 and 30.

For the sake of simplicity, each of these purposes will be described separately below. However, it should be appreciated that a controller 34 and an external memory medium 46 that is able to store all, or a combination, of the information described below, is included within the scope of the present invention.

Update Information

Figure 3A:
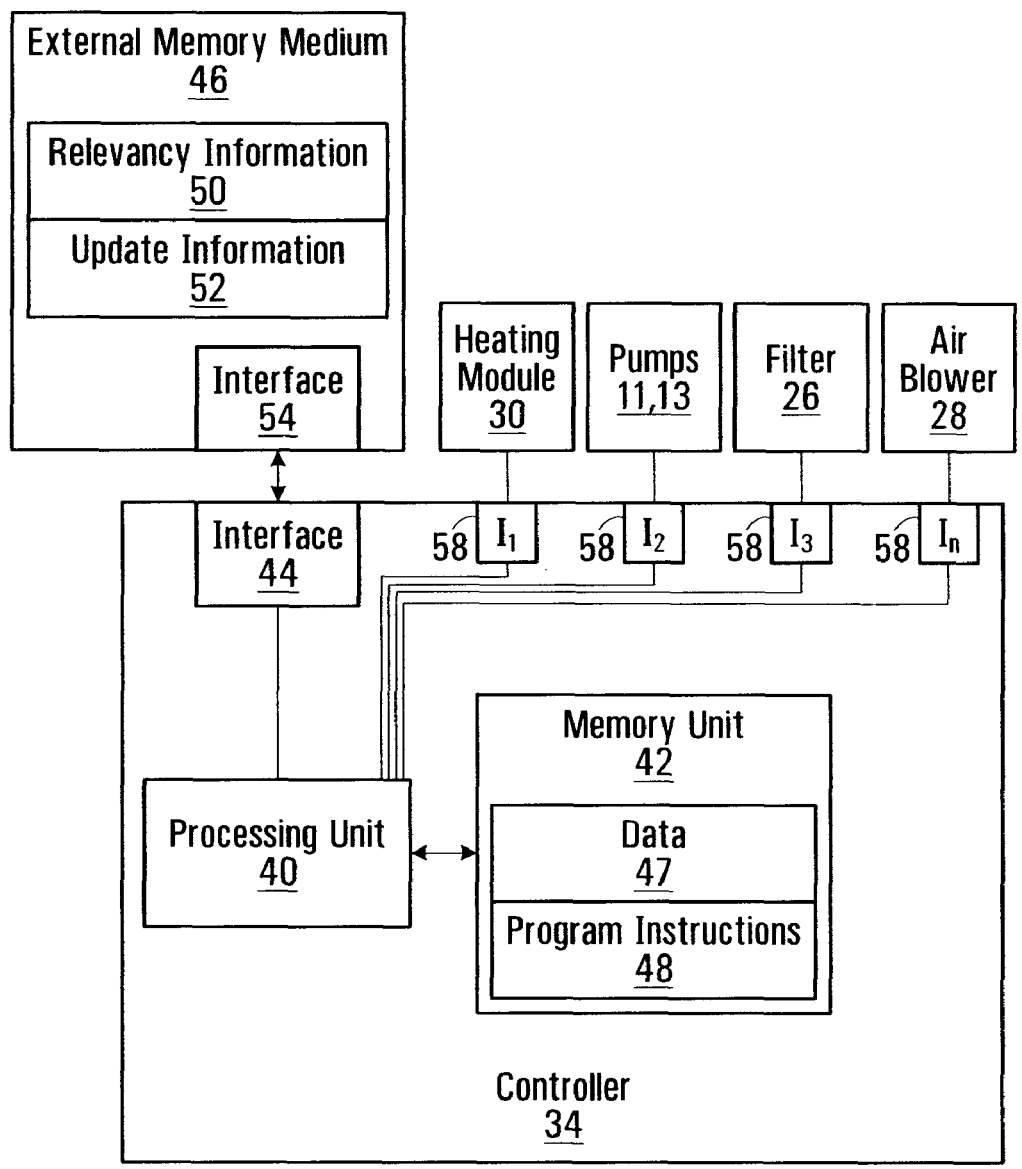
FIG. 3A shows a first non-limiting block diagram of a bathing unit controller and an external memory medium in accordance with a first example of implementation of the present invention.

Shown in FIG. 3A is a non-limiting block diagram of the controller 34 and an external memory medium 46 in accordance with a specific implementation of the present invention. As shown, the controller 34 includes the processing unit 40 and the memory unit 42 for storing data 47 and program instructions 48. The controller 34 further includes the plurality of bathing unit component interfaces 58 for enabling the controller to communicate with the bathing unit components 11, 13, 26, 28, 30, and the interface 44 through which the controller 34 establishes a communication link with the external memory medium 46.

During the course of operation of the bathing unit system 10, the processing unit 40 processes the data 47 and program instructions 48 stored in the memory unit 42 in order to control the operation of the set of bathing unit components 11, 13, 26, 28, 30. Over the lifetime of the bathing unit system 10, it may be required and/or desirable to update the program instructions 48 contained in the memory unit 42. These updates may be done in order to add and/or modify the functionality of the controller 34, such as in the case where a bathing unit component is changed or added. For example, at some point during the lifetime of the bathing unit system 10, the heating module 30 may be changed for a newer, more up-to-date heating module 30, or a new bathing unit component, such as a CD, or DVD player may be added to the bathing unit system 10.

In the past, in order to update the data 47 and/or program instructions 48 contained within the controller 34, the entire controller 34 would need to be sent back to the manufacturer, or supplier. Alternatively, a technician would need to visit the premises of the bathing unit system 10 to transfer updates to the program instructions 48 stored in the controller 34. In either of these cases, the process for updating the data 47 and/or program instructions stored within the memory unit 42 is an expensive and inconvenient process.

In accordance with the present invention, and as shown in FIG. 3A, the external memory medium 46 stores relevancy information 50 and update information 52 for enabling the data 47 and/or the program instructions 48 in the controller 34 to be updated. The relevancy information 50 stores information for identifying and characterizing the update information 52. For example, the relevancy information 50 may include the version of the update information 52, the date of the update information, the data structure of the update information 52, a software ID# associated with the update information 52 or an identification of a bathing unit component to which the update information 52 relates, among other possibilities. The update information 52 includes the necessary information (such as program code) for updating the data 47 and program instructions 48 stored in the memory unit 42 of the controller 34. The update information 52 can include one or more files that each relate to different updates that can be applied to the data 47 and/or program instructions 48 stored at the controller 48. For example, a first update file may be operative for updating the controller 34 such that it can control a new bathing unit component, such as a DVD player, whereas a second update file may be operative for updating the controller 34 such that it corrects a bug that was identified in the program instructions 48.

As will be described in more detail below, upon establishment of a communication link between the controller 34 and the external memory medium 46, the controller 34 is able to access information (such as one or both of the relevancy information 50 and the update information 52) stored within the external memory medium 46, so as to enable the controller 34 to be configured on the basis of the update information 52. The manner in which the update information 52 is accessed for causing the controller 34 to be configured will be described in more detail below with respect to the flow chart shown in FIG. 3B.

In accordance with the present invention, all processing required for accessing information stored on the external memory medium 46 is performed at the controller 34, either independently, or in combination with instructions received through the control panel 32 or an external device other than the external memory medium. The external memory medium 46 simply needs to be connected either directly, or indirectly, to the interface 44 of the controller 34, such that the controller 34 can access and process the information stored thereon. This greatly simplifies the updating process since a user/owner of the bathing unit system 10, or a manufacturer or supplier of the bathing unit system 10, can simply be provided with the external memory medium 46 containing the necessary information, in order to cause the controller 34 to be updated.

Figure 3B:
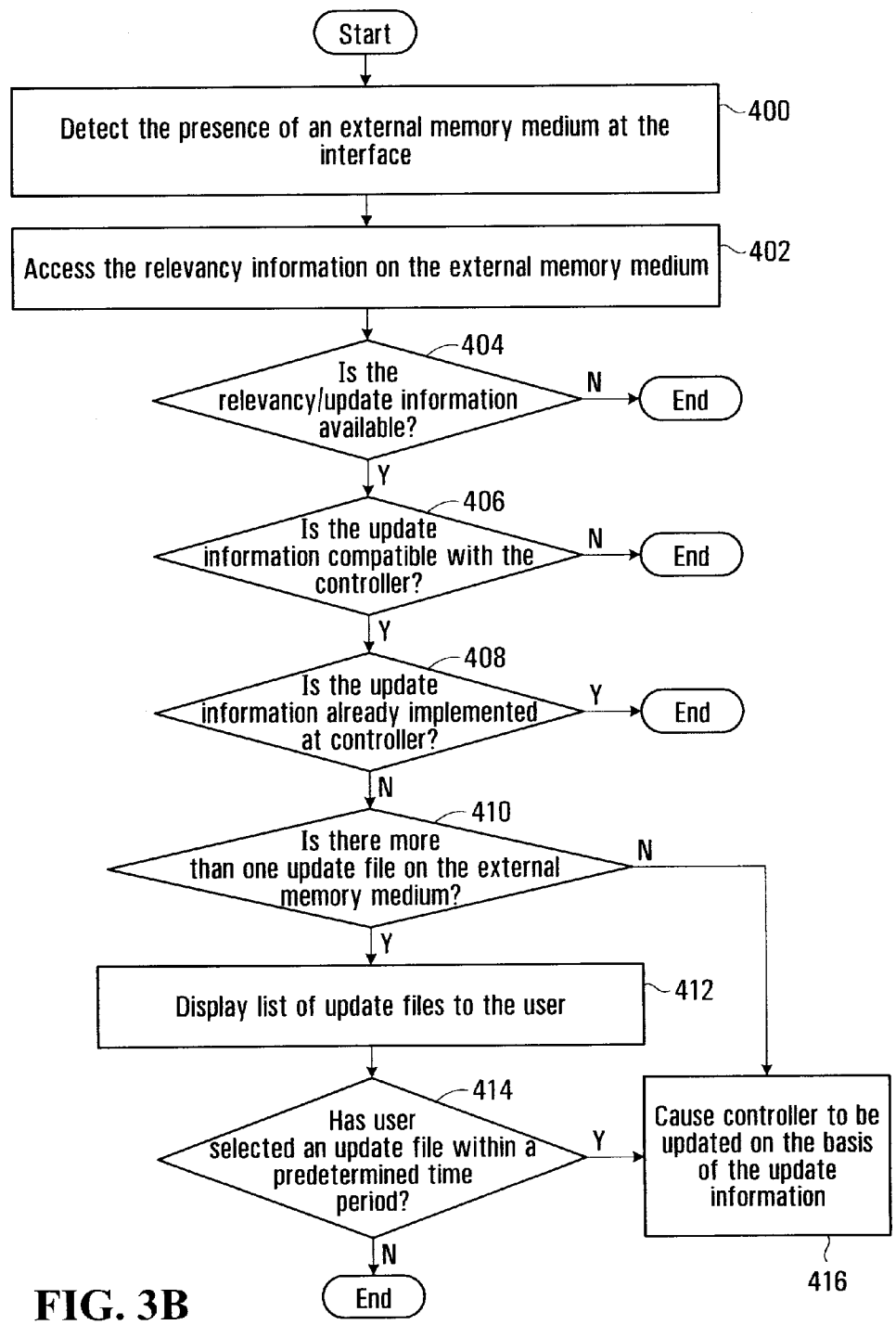
FIG. 3B shows a non-limiting flow diagram of a process for configuring a bathing unit controller in accordance with update information stored on an external memory medium in accordance with a non-limiting example of implementation of the present invention.

It should be appreciated that prior to commencing the updating procedure shown in FIG. 3B, a communication link must first be established between the external memory medium 46 and the controller 34. In the case where the interfaces 44 and 54 are male and female physical connection ports respectively, the communication link is established by physically connecting the two connectors together. It should be appreciated that in the case where the interfaces 44 and 54 are infrared ports, the communication link is established by bringing the two infrared ports into proximity of one another. Likewise, in the case where interfaces 44 and 54 are RF transceivers, the communication link is established by bringing the two transceivers within range of one another.

With reference to FIG. 3B, once a communication link has been established between the controller 34 and the external memory medium 46, at step 400 the controller 34 detects the presence of the external memory medium 46 at the interface 44.

The detection of the presence of the external memory medium 46 can be done in a variety of ways. In accordance with a first non-limiting embodiment, this detection may take place on the basis of instructions received from a user via the control panel 32. For example, once a user has caused the external memory medium 46 to be connected to the controller 34, the user can then use the control panel 32 in order to instruct the controller 34 to access an external memory medium 46 that is connected to the interface 44. On the basis of these instructions, and a program element stored within the program instructions 48, the controller 34 will then detect the presence of the external memory medium 46.

In an alternative embodiment, the controller 34 may automatically detect the presence of the external memory medium 46 once the external memory medium 46 is connected to the interface 44. For example, the interface 44 may include a physical or electronic sensor that detects the presence of the external memory medium 46 and then transmits a signal indicative of this presence to the processing unit 40 of the controller 34. In a further embodiment, the controller 34 may continually run a program module that periodically checks whether there is an external memory medium 46 connected at the interface 44.

Once the controller 34 has detected the presence of the external memory medium 46, at step 402 the controller 34 accesses the relevancy information 50 that is stored within the external memory medium 46. This step of accessing and reading the relevancy information 50 is performed on the basis of a program module stored within the program instructions 48 at the controller 34. For example, the controller 34 may issue a signal to the external memory medium 46 for causing the relevancy information to be released to the controller 34 through the interfaces 54 and 44. As such, the relevancy information 50 is automatically accessed and read upon detection of the presence of the external memory medium 46.

As mentioned above, the relevancy information 50 stores information associated to the update information 52, such as the version of the update information 52, the date of the update information, the data structure of the update information 52 or an identification of a bathing unit component to which the update information 52 relates, among other possibilities. In a non-limiting example of implementation, it is possible that the relevancy information 50 also includes a program element, such as an autoexec file, that provides the controller 34 with the necessary information to complete the remaining steps of the below-described process. It should, however, be appreciated that regardless of whether the controller 34 executes the remaining steps of the update process on the basis of program instructions stored at the controller 34, or on the basis of a file downloaded from the external memory medium 46, all the processing for executing this process is performed at the controller 34.

At step 404, once the processing unit 40 has accessed information stored within the external memory medium 46, the processing unit 40 of the controller 34 performs a verification step. More specifically, at step 404, the processing unit 40 determines that there is in fact relevancy information 50 and update information 52 stored on the external memory medium 46. In certain cases it is possible that the external memory medium 46 is blank or that the files that were stored on the external memory medium 46 were corrupted. In the case where there is no information stored on the external memory medium 46, or the information has been corrupted, the process of FIG. 3B is terminated. In certain cases the controller 34 can advise a user of the bathing unit system 10 that there is no usable information on the external memory medium 46 via the control panel 32. Or, the controller 34 will do nothing and wait for a user to break the communication link between the external memory medium 46 and the controller 34.

In the case where there is relevancy information 50 and update information 52 stored on the external memory medium 46, the processing unit 40 proceeds to step 406. At step 406, the processing unit 40 determines whether the update information 52 is compatible with the controller 34, and specifically with the program instructions 48 stored within the controller. This determination may be made on the basis of the information included within the relevancy information 50. For example, in the case where the update information 52 is stored in an incompatible data structure that will not be able to be integrated into the program instructions 48, the processing unit 40 will determine that the update information is not compatible, and the process of FIG. 3B is terminated. In certain circumstances, the processing unit 40 may also verify whether the update information 52 is suitable for use with the controller 34, by verifying the software ID of the update information 52 in order to determine if it matches with the ID of the controller 34, or the ID of the program instructions (or other software) that is already stored at the controller 34. For example, different bathing unit systems 10 may be associated with an ID that designates the type of bathing unit system 10, or the customer of the bathing unit system 10. Therefore, the update information 52 must have a corresponding software ID in order to be suitable for use with that controller 34. In the case where the update information 52 is not compatible with, or not suitable for use with, the controller 34, the process of FIG. 3B is terminated. The controller 34 can then advise a user of the bathing unit system 10 that the information is incompatible with the controller 34 via the control panel 32. Or, the controller 34 can do nothing and wait for a user to break the communication link between the external memory medium 46 and the controller 34.

In the case where the update information 52 that is stored at the external memory medium 46 is compatible with the program instructions 48 stored at the controller 34, the processing unit 40 will proceed to step 408.

At step 408, the processing unit 40 determines whether the update information 52 stored on the external memory medium 46 is already implemented at the controller 46. This determination can be done on the basis of the relevancy information 50. As mentioned above, the relevancy information 50 stores information for identifying and characterizing the update information 52 that is stored on the external memory medium 46. Therefore, the relevancy information 50 may include information indicative of the version of the one or more of the update files contained within the update information 52 or a date stamp associated with the one or more of the update files contained within the update information 52. The relevancy information 50 may also include an indication of a component to which a particular update file within the update information 52 is associated. It should be appreciated that the relevancy information 50 can include any type of data for characterizing the update information 52. For example, the relevancy information 50 can be a separate file or alternatively, the relevancy information can be the file name or bibliographic information associated with the one or more update files contained within the update information 52.

In the case where the processing unit 40 determines that all of the update information 52 has been implemented at the controller 34, the process of FIG. 3B is terminated. In such a case, the controller 34 can provide an indication to a user that there are no new updates, or can wait for a user to break the communication link between the external memory medium 46 and the controller 34.

Alternatively, in the case where one or more of the files contained within the update information 52 have not been implemented at the controller 34, the processing unit proceeds to step 410. At step 410, the processing unit 40 determines whether there is more than one update file contained within the update information 52. In the case where there is only one update file then the processing unit 40 proceeds to step 416 wherein the controller is caused to be configured on the basis of the update information 52, and specifically on the basis of the update file.

In the case where it is determined that there is more than one update file contained within the update information 52 stored on the external memory medium 46, then the process proceeds to step 412.

At step 412, the update information 52, that contains the multiple update files is displayed to a user of the bathing unit system 10. The update information 52 can be displayed to the user via the control panel 32, or via an external device (such as a PDA or computer monitor, among other possibilities) that can be connected to the controller 34. The user can then select one or more of the update files contained within the update information 52 that should be used to update the controller 34. For example, the user may select an update file that contains more recent update information than what is currently used at the controller 34, or in the case where a new bathing unit component has been added to the bathing unit system 10, the user may select the update file that is associated with that bathing unit component.

Although not shown in FIG. 3B, in an alternative embodiment, the multiple different update files contained within the update information 52 are not displayed to a user. As such, instead of an update file being selected by a user, an update file from the list of update files can be selected by the processing unit 40. The processing unit 40 may select an update file on the basis of the relevancy information 50, or on the basis of an input received from a user via the control panel 32. For example, the processing unit 40 might compare information in the relevancy information 50 with information already stored at the controller 34 in order to determine whether the program instructions 48 should be configured on the basis of the update information 52. In the case where the relevancy information 50 indicates that an update file in the update information 52 is a more recent version of the program instructions 48, the processing unit 40 will select that update file. Or, in the case where a new bathing unit component has been added to the bathing unit system 10, and an identification of this new bathing unit component has been entered by a user via the control panel 32, if an update file pertaining to that new component is included within the update information 52 then the processing unit 40 will select that update file.

Returning back to the flow chart in FIG. 3B, in the case where a user selected an update file from a list of update files at step 412, prior to causing the selected update file to be implemented, the processing unit 40 proceeds to step 414. At step 414, the processing unit 40 determines whether the user has selected one of the update files within a predetermined time period. Step 414 can be an optional step, and is included in order to provide a time-out function. As such, in the case where a user takes too long to select a desired update file, the process of FIG. 3B is terminated, or the processing unit 40 may issue a message to the user via the control panel 32, indicating "do you require more time?".

In the case where a user did select one of the update files within a predetermined time period, the processing unit 40 proceeds to step 416 wherein the controller 34 is caused to be updated on the basis of the update information 52, and specifically the update file selected by the user. More specifically, at step 416, the processing unit 40 causes the controller 34 to be updated by updating the data 47 and/or program instructions 48 on the basis of the update file contained in the update information 52.

In accordance with a first non-limiting example of implementation, the update information 52 may be released to the controller 34 at the same time as the relevancy information 50, at step 402 and is just not used by the controller 34 until it is needed. Alternatively, in accordance with a second non-limiting example of implementation, the update information 52 may not be released to the controller 34 until step 410 when the controller 34 determines whether there is more than one update file in the update information 52.

As previously mentioned, the process that has been described above with respect to FIG. 3B can be performed entirely by the controller 34 by executing a program element stored in the memory unit 42. For example, the memory unit 42 stores program instructions that are executed by the processing unit 40 for causing the processing unit 40 to access the relevancy information 50 and update information 52, determine whether or not to update the data 47 and/or program instructions 48 and cause the data 47 and/or program instructions 48 at the controller 34 to be updated.

Alternatively, the process that has been described above with respect to FIG. 3B can be performed by the controller 34 along with input from a user via the control panel 32. In such a case, the memory unit 42 of the controller 34 still stores program instructions that are executed by the processing unit 40, however, the detection of the presence of the external memory medium 46 and the selection of an update file contained within the update information 52 may all be done on the basis of instructions received from the user.

Given that all the processing required for executing the process described with respect to FIG. 3B is performed at the controller 34, either independently, or in combination with instructions received through the control panel 32, no processing is done by the external memory medium 46. As such, the external memory medium 46 simply includes stored data, and in some cases stored program elements, but does not have any processing capability built in.

As mentioned above, in certain circumstances, the external memory medium 46 may include a program element to be executed by the processing unit 40 of the controller 34. For example, an autoexec file can be included within the relevancy information 50. As such, once the controller 34 has accessed the relevancy information 50, the processing unit 40 of the controller 34 then executes the autoexec file stored on the external memory medium 46 in order to execute steps 404-416 of the process described with respect to FIG. 3B. In such an embodiment, it should be appreciated that although the external memory medium 46 does in fact include a program element, the processing functionality is still performed at the controller 34.

Configuration Information

As mentioned above, the external memory medium 46 can also be used for providing configuration information for configuring the functionality of the controller 34.

Figure 4A:
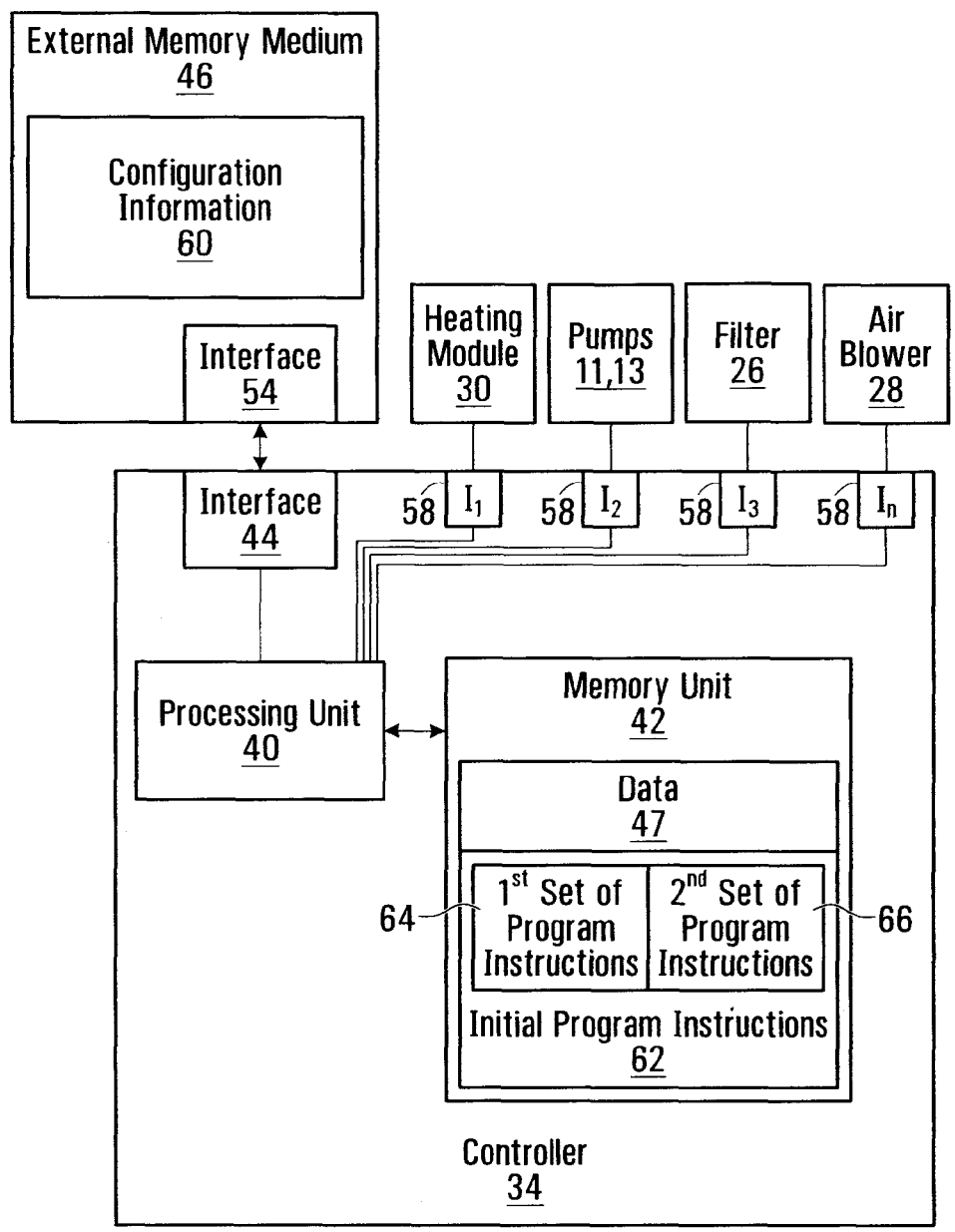
FIG. 4A shows a second non-limiting block diagram of a bathing unit controller and external memory medium in accordance with a second example of implementation of the present invention.
Figure 4B:
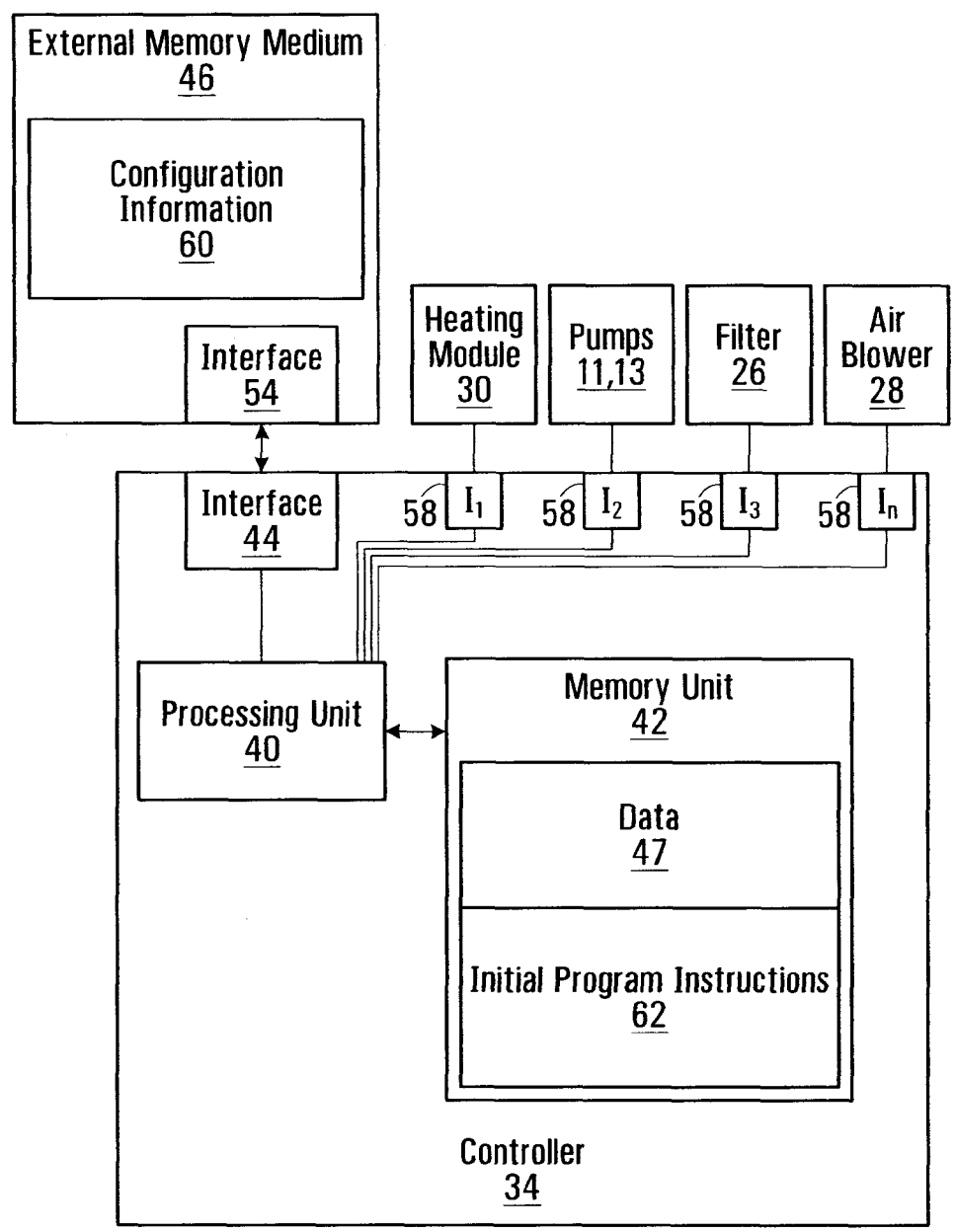
FIG. 4B shows a third non-limiting block diagram of a bathing unit controller and external memory medium in accordance with a third example of implementation of the present invention.

Shown in FIGS. 4A and 4B are two non-limiting block diagrams of the controller 34 and an external memory medium 46 in accordance with the present invention. In both cases, the controller 34 includes the processing unit 40, the memory unit 42, the plurality of bathing unit component interfaces 58 for enabling the controller to control the bathing unit components 11, 13, 26, 28, 30 and the interface 44 through which the controller 34 can establish a communication link with the external memory medium 46.

It should be appreciated that different bathing unit systems 10 can have very different operational capabilities, and that depending on the nature of the bathing unit system 10 (meaning the number and type of bathing unit components included) the manner in which the controller is configured will also need to be different. More specifically, the controller will need to be configured differently depending on the number and type of bathing unit components included, or the model of bathing unit system 10 in which the controller 34 is being used.

For example, in a first configuration the controller may control a first set of bathing unit components, while in a second configuration the controller may control a second set of bathing unit components. The second set of bathing unit components may be a reduced set of the first set of bathing unit components or the second set of bathing unit components may be a completely different set of bathing unit components than the first set of bathing unit components. In a further non-limiting example, the controller may be configured in accordance with different configurations in order to be able to control the operational settings of the bathing unit components differently. For example, depending on the configuration, the controller may be able to operate the water pump at different speeds, or control the timing of the bathing unit components differently. In addition, depending on the configuration of the controller, the controller may be able to control the type of filtration that is used to filter the water. Therefore, it should be appreciated that the way the controller controls the operational settings of the bathing unit components can depend on the configuration of the controller.

In order to avoid having to manufacture different customized bathing unit controllers 34 for each different type of bathing unit system 10 that is produced by a given manufacturer, it is desirable to make a generic bathing unit controller that includes the structure (and optionally software) necessary such that it can be configured in order to be suitable for controlling many different types of bathing unit systems 10. In this manner, once it is known what type of bathing unit system 10 a controller is going to be used with, the generic controller 34 can simply be configured for controlling that type of bathing unit system 10.

The manner in which a generic bathing unit controller 34 can be configured can be done in at least two different manners. In accordance with a first non-limiting embodiment depicted in FIG. 4A, the structure and software required for multiple different configurations are already included within the generic controller 24. In other words, the controller 34 is manufactured such that it includes the structure and the different sets of program instructions necessary for causing the controller 34 to acquire different configurations.

In accordance with the second non-limiting embodiment, which is depicted in FIG. 4B, no pre-stored program instructions are included within the memory unit 42 of the controller for enabling the controller 34 to acquire a given configuration. Instead, in order to cause the controller 34 to acquire a desired configuration, program instructions for causing the controller 34 to acquire that configuration must be downloaded to the controller 34 from an external source.

Each of these embodiments will now be described in more detail.

Referring back to FIG. 4A, the memory unit 42 of the controller 34 stores a first set of program instructions 64 that when activated cause the controller 34 to acquire a first configuration, and a second set of program instructions 66 that when activated cause the controller 34 to acquire a second configuration. Although only two sets of program instructions are shown in the memory unit 42 of FIG. 4A, it should be appreciated that any number of sets of program instructions could be stored within the memory unit 42.

When it is known what kind of bathing unit system 10 the controller 34 will be used for, the controller 34 is caused to implement a given set of program instructions from the pre-stored sets of program instructions 64, 66 thereby causing the controller 34 to acquire a given configuration. As mentioned above, the different sets of program instructions are operative for causing the controller 34 to acquire different configurations for controlling different bathing unit systems 10. For example, the first set of program instructions 64 may be operative for configuring the controller 34 to control a high-end bathing unit system, whereas the second set of program instructions 64 may be operative for configuring the controller to control a lower-end bathing unit system. The high-end bathing unit system 10 may require the controller 34 to control a first set of bathing unit components that includes a heating module, air pumps, an air blower, an ozonator, a CD player, a DVD player and lighting units. In contrast, a low-end bathing unit system 10 may require the controller 34 to control a second set of bathing unit components that is a reduced set that includes only the heating module, air pumps and air blower.

Alternatively, the first and second set of program instructions 64, 66 may cause the controller 34 to control the same set of bathing unit components, but the first set of program instructions configures the controller 34 to control more settings of the components. In yet a further alternative, the first and second set of program instructions 64, 66 may configure the controller 34 to control completely different sets of bathing unit components. In such a scenario, and with reference to FIG. 2, the first set of program instructions may configure the controller 34 to control only the bathing unit components connected to the smaller bathing unit component interfaces 58, whereas the second set of program instructions may configure the controller 34 to control only the bathing unit components connected to the larger bathing unit component interfaces 58.

Again, although only two sets of program instructions for configuring the controller 34 in two different ways are being described herein, the controller 34 may be suitable for pre-storing any number of sets of program instructions for acquiring any number of different configurations without departing from the spirit of the invention.

In accordance with the present invention, the information necessary for causing the controller 34 to acquire one of the configurations that has been pre-stored within the controller's memory unit 42 is included as the configuration information 60 within the external memory medium 46. As such, the configuration information 60 stored on the external memory medium 46 is operative for configuring the controller 34 by causing one of the pre-stored sets of program instructions to be implemented such that the controller 34 operates by executing the implemented set of program instructions. As will be described in more detail further on in the description, the configuration information 60 stored on the external memory medium 46 may include a code, or a set of program instructions, for causing the controller 34 to select a set of program instructions from the pre-stored set of program instructions.

In accordance with the embodiment shown in FIG. 4A, the configuration information 60 that is stored on the external memory medium 46 may include a single access code, or a single program element, that acts as a key to unlock the appropriate set of program instructions that are pre-stored within the controller 34. Alternatively, the configuration information 60 that is stored on the external memory medium 46 may include a plurality of codes, or a plurality of program elements, that are each associated with a respective set of program instructions 64, 66 that are stored in the memory 42 of the controller 34. In addition, each of these plurality of codes, or plurality of program elements, is also associated with a serial number or a password. The serial number could be associated with a serial number of a bathing unit system 10, or with a type of configuration, among other possibilities. As such, based on a user input (via the control panel 32, for example) of the appropriate serial number or password, the code corresponding to that serial number or password unlocks the corresponding set of program instructions that are pre-stored within the controller 34. In this manner, the controller 34 acquires the configuration that is suitable for the bathing unit system 10 associated with the serial number or password.

Referring now to the embodiment shown in FIG. 4B, no pre-stored configuration information is included within the memory unit 42 of the controller 34. In other words, no pre-stored program instructions are included within the memory unit 42 for causing the controller 34 to acquire a given configuration. Instead, the memory unit 42 includes only initial program instructions 62, which provide the controller 34 with the appropriate program elements for facilitating the download of the necessary configuration information. In this embodiment, until the controller 34 has downloaded appropriate configuration information, the controller 34 cannot function to control the bathing unit components 11, 13, 28, 26, 30, in a desired manner.

In accordance with this embodiment, the configuration information 60 that is stored within the external memory medium 46 includes one or more sets of program instructions that can be downloaded to the controller 34 for configuring the controller 34. For example, the configuration information 60 may include only a single set of program instructions that can be downloaded so as to configure the controller 34 such that it operates by executing that set of program instructions. Or alternatively, the configuration information 60 stored on the external memory medium 46 can include a plurality of sets of program instructions, such that each set of program instructions would configure the controller 34 in a different way. The appropriate set of program instructions to be provided to the controller 34 can be selected based on a selection by a user, or based on an input of a serial number, or other selection criteria, by a user via the control panel 32.

As such, the configuration information 60 stored on the external memory medium 46 is operative for configuring the controller 34 by causing a set of program instructions to be downloaded to the controller 34, thereby causing the controller to be configured in accordance with that set of program instructions.

The manner in which the configuration information 60 is accessed for causing the controller 34 to be configured, will now be described in more detail with respect to the flow chart shown in FIG. 4C. The process described with respect to FIG. 4C is applicable to both of the embodiments shown in FIGS. 4A and 4B.

In accordance with the present invention, the processing required for accessing the configuration information 60 stored on the external memory medium 46 is performed at the controller 34, either independently, or in combination with instructions received from a user via the control panel 32. The program logic required to perform this processing can be included within the initial program instructions 62 at the controller 34, or alternatively, some of the program logic can be stored on the external memory medium 46 (such as in the case where the configuration information 60 includes an autoexec file) to be executed by the processing unit 40 of the controller 34.

As such, the external memory medium 46 simply needs to be connected either directly, or indirectly, to the interface 44 of the controller 34, such that the controller 34 can access and process the configuration information 60 stored thereon. This greatly simplifies the updating process since a user, owner or supplier of the bathing unit system 10, can simply be provided with the external memory medium 46 containing the necessary configuration information.

Figure 4C:
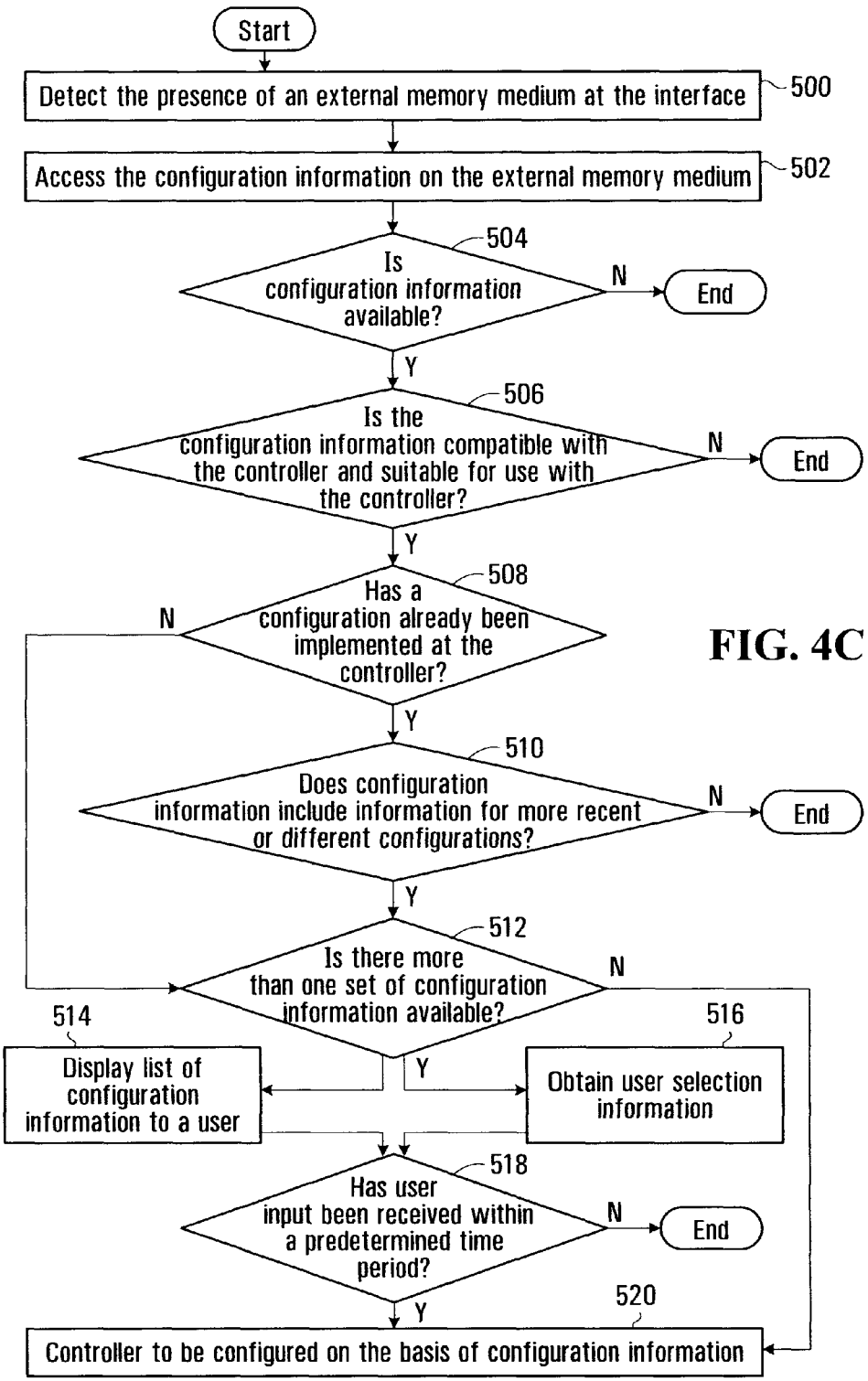
FIG. 4C shows a non-limiting flow diagram of a process for configuring a bathing unit controller in accordance with configuration information stored on an external memory medium in accordance with a non-limiting example of implementation of the present invention.

It should be appreciated that prior to commencing the configuration procedure shown in FIG. 4C, a communication link is established between the external memory medium 46 and the controller 34. In the case where the interfaces 44 and 54 are female and male USB connection ports respectively, the communication link is established by physically connecting the two portions of the USB connectors together. It should, however, be appreciated that in the case where the interfaces 44 and 54 are infrared ports, the communication link is established by bringing the two infrared ports into proximity of one another. Likewise, in the case where interfaces 44 and 54 are RF transceivers, the communication link is established by bringing the two transceivers within range of one another.

With reference to FIG. 4C, once a communication link has been established between the controller 34 and the external memory medium 46, at step 500 the controller 34 detects the presence of the external memory medium 46 at the interface 44.

The detection of the presence of the external memory medium 46 can be done in a variety of ways. In accordance with a first non-limiting embodiment, this detection may take place on the basis of instructions received from a user via the control panel 32. For example, once a user has caused the external memory medium 46 to be connected to the controller 34, the user can then use the control panel 32 in order to instruct the controller 34 to access the external memory medium 46 that is connected to the interface 44. On the basis of these instructions, and a program element stored within the initial program instructions 62, the controller 34 will then detect the presence of the external memory medium 46.

In an alternative embodiment, the controller 34 may automatically detect the presence of the external memory medium 46 once the external memory medium 46 has been connected to the interface 44. For example, the interface 44 may include a physical or electronic sensor that detects the presence of the external memory medium 46 and then transmits a signal indicative of this presence to the processing unit 40 of the controller 34. In a further embodiment, the controller 34 may continually run a program module that periodically checks whether there is an external memory medium 46 connected at the interface 44.

Once the controller 34 has detected the presence of the external memory medium 46, at step 502 the controller 34 accesses the configuration information 60. This step of accessing and reading the configuration is performed on the basis of a program module stored within the initial program instructions 62 at the controller 34. For example, the controller 34 may issue a signal to the external memory medium 46 for causing the configuration information 60 to be released to the controller 34 through the interfaces 54 and 44. As such, the configuration information 60 is automatically accessed and read upon detection of the presence of the external memory medium 46.

As mentioned above, the configuration information 60 stores either one or more access codes, or program elements, that act to unlock or implement the appropriate set of program instructions that are pre-stored within the controller 34, or alternatively, the configuration information 60 stores one or more sets of program instructions that can be downloaded to configure the controller 34. In a non-limiting example of implementation, it is possible that the configuration information 60 also includes a program element, such as an autoexec file, that provides the controller 34 with the necessary information to complete the remaining steps of the below-described process. It should, however, be appreciated that regardless of whether the controller 34 executes the remaining steps of the update process on the basis of program instructions stored within the initial program instructions 62 at the controller 34, or on the basis of a file downloaded from the external memory medium 46, all the processing for executing this process is performed at the controller 34.

At step 504, once the processing unit 40 has accessed information stored within the external memory medium 46, the processing unit 40 of the controller 34 performs a verification step. More specifically, at step 504, the processing unit 40 determines that there is in fact configuration information 60 available and stored on the external memory medium 46. In certain cases it is possible that the external memory medium 46 is blank or that the configuration information 60 that was stored on the external memory medium 46 was corrupted. In the case where there is no information stored on the external memory medium 46, or the information has been corrupted, the process of FIG. 4C is terminated. In certain cases the controller 34 can advise a user of the bathing unit system 10 via the control panel 32 that there is no usable configuration information 60 on the external memory medium 46. Or, the controller 34 will do nothing and wait for a user to break the communication link between the external memory medium 46 and the controller 34.

In the case where there is configuration information 60 available on the external memory medium 46, the processing unit 40 proceeds to step 506. At step 506, the processing unit 40 determines whether the configuration information 60 is compatible with the controller 34, and specifically with the program instructions 48 stored within the controller 34, and whether the configuration information 60 stored on the external memory medium 46 is suitable for use with the controller 46. (It should be appreciated that this step is optional, and is preferably performed when the configuration information 60 includes program instructions to be downloaded to the controller 34).

When checking whether the configuration information 60 is compatible with the controller, the processing unit 40 verifies the data structure of the configuration information 60 stored within the external memory medium 46. In the case where the configuration information 60 is stored in an incompatible data structure that will not be able to be integrated into the program format of the initial program instructions 62 (or the first and second sets of program instructions 64, 66 in FIG. 4A), the processing unit 40 will determine that the configuration information 60 is not compatible. When checking whether the configuration information 60 is suitable for use with the controller 34, the processing unit 40 verifies the software ID of the configuration information 60 in order to determine if it matches with the ID of the controller 34, or the ID of the program instructions (or other software) that is already stored at the controller 34. For example, different bathing unit systems 10 may be associated with an ID that designates the type of bathing unit system 10, or the supplier of the bathing unit system 10. Therefore, the configuration information 60 must have a corresponding software ID in order to be suitable for use with that controller 34. In the case where the configuration information 60 is not compatible with the controller 34 and/or the configuration information 60 is not suitable for use with the controller 34, the process of FIG. 4C is terminated. The controller 34 can advise a user of the bathing unit system 10 via the control panel 32. Or, the controller 34 can do nothing and wait for a user to break the communication link between the external memory medium 46 and the controller 34.

In the case where the configuration information 60 that is stored at the external memory medium 46 is compatible with the initial program instructions 62 (or the first and second program instructions 64, 66) stored at the controller 34, the processing unit 40 will proceed to step 508.

At step 508, the processing unit 40 determines whether the controller 34 has already been configured, meaning has a configuration already been implemented at the controller 34. In the case where the processing unit 40 determines that a configuration has not been implemented at the controller 34, then the processing unit 40 proceeds to step 512, which will be described in more detail below. Whereas, in the case where a the processing unit 40 determines that a configuration has been implemented at the controller 34, then the processing unit 40 proceeds to step 510.

At step 510, the processing unit 40 determines 1) whether the configuration information 60 contained within the external memory medium 46 includes a more recent version of the set of program instructions for the configuration that is currently being implemented by the controller 34 and 2) whether the configuration information 60 contained within the external memory medium 46 includes an access key or program element for "unlocking" an alternative set of program instructions that have been pre-stored at the controller for enabling the controller to implement a different configuration, or includes a different set of program instructions that can be downloaded to the controller for enabling the controller to implement a different configuration.

In the case where configuration information 60 includes none of the above information, then the process of FIG. 4C is terminated. The processing unit 40 can then advise a user via the control panel 32 that no new information is included within the external memory medium 46. Or, the processing unit 40 can do nothing and wait for a user to break the communication link between the external memory medium 46 and the controller 34.

At step 512, the processing unit 40 determines whether there is more than one set of configuration information 60 stored within the external memory medium 46. In the case where the configuration information 60 only contains sufficient information to allow the controller 34 to acquire one configuration, then the process proceeds to step 520, wherein the controller 34 is configured on the basis of the configuration information 60. This will be described in more detail further on in the description.

Whereas, in the case where the configuration information 60 contains sufficient information to allow the controller 34 to acquire a configuration from a selection of configurations (meaning that the configuration information 60 includes a plurality of sets of program instructions, or a plurality of different access codes or program elements), then the process proceeds to one of step 514 and 516. In the case where the controller 34 includes a plurality of different sets of program instructions stored within the memory 42 (as shown in FIG. 4A) then the process proceeds to step 516, wherein a user is required to enter information, such as a serial number or a password, such that the controller 34 will know which access code or program element to use to unlock a corresponding set of program instructions. Alternatively, in the case where the controller 34 does not have any pre-stored program instructions (as shown in FIG. 4B) then the process proceeds to step 518, wherein the different sets of program instructions that are stored on the external memory medium 46 are displayed to a user. These can be displayed via the control panel 32, or via an external device (other than the external memory medium) such that a user can select from among them.

Regardless of whether step 514 or step 516 (or both) is executed (which depends on the physical structure and programming of the controller 34), prior to causing the new (or updated) configuration to be implemented by the controller 34, the processing unit 40 goes to optional step 518. At step 518, the processing unit 40 determines whether the user has selected one of the sets of program instructions, or entered the appropriate selection information, within a predetermined time period. Step 518 can be an optional step, and is included in order to provide a time-out function. As such, in the case where a user takes too long to select one of the displayed sets of program instructions, or enter the appropriate selection information, the processing unit 40 could stop the process. As such, a user would need to remove the external memory medium 46 and start the process all over again. Or alternatively, the processing unit 40 may issue a message to the user via the control panel 32, indicating "do you require more time?".

In the case where the user's input was received within a predetermined time period, the processing unit 40 proceeds to step 520 wherein the controller 34 is caused to implement a configuration on the basis of the configuration information 60. This step can be performed in a variety of different manners, depending on whether the controller 34 has pre-stored program instructions (as shown in FIG. 4A) or depending on whether the controller 34 does not have any pre-stored program instructions (as shown in FIG. 4B).

In the case where the controller 34 has pre-stored program instructions (as shown in FIG. 4A), the manner in which the controller is caused to be configured is dependent on the type of configuration information 60 that is stored within the external memory medium 46. As mentioned above, the configuration information may be in the form of an access code, or program element, that acts as a key suitable for unlocking an appropriate one of the first set of program instructions 64 or the second set of program instructions 66 (or additional sets of program instructions, if included within the memory 42). As such, a given access code or a given program element will be associated with a given set of program instructions. Therefore, each access code or program element will be suitable for unlocking only its associated set of program instructions.

Alternatively, the configuration information 60 may include one or more configuration files that are each suitable for configuring a respective set of program instructions that have been pre-stored within the controller 34.

In the case where the external memory medium 46 includes only a single access code, or a single configuration file, the processing unit 40 of the controller 34 is operative for executing a program element stored in the initial program instructions 62 (or in an autoexec file on the external memory medium 46) for causing the access code, program element or configuration file stored within the external memory medium 46 to "unlock" or configure its corresponding set of program instructions contained within the memory 42. Once unlocked, or configured, the controller 34 can execute that set of program instructions, such that the controller 34 is configured in accordance with those program instructions.

In the case where the external memory medium 46 includes a plurality of access codes, program elements, or configuration files, that are each associated with a respective set of program instructions, the manner in which the controller is configured is a bit different. More specifically, the configuration information 60 may be processed at least in part on the basis of additional information supplied to the processing unit 40 via the user control panel 32 of the bathing unit system 10, as described above with respect to step 516. As previously described, in addition to being associated to a respective set of program instructions stored within the controller 34, each access code, program element or configuration file, that is stored on the external memory medium 46 is also associated with a bathing unit serial number, or a password. As such, once the external memory medium 46 has been connected to the controller 34 and the controller has accessed the configuration information 60, then a human operator may enter a serial number, or a password, into the control panel 32 of the bathing unit system 10. By entering the serial number or password, the access code, program element or configuration file that is associated with that serial number or password is then caused to be executed by the controller 34. This, in turn, causes the set of program instructions associated with that access code, program element, to be "unlocked" and executed by the controller 34, such that the controller 34 is configured in accordance with those program instructions.

In this manner, a manufacturer of the bathing unit controller 34 can manufacture a common controller 34, and then depending on the desired use of the controller 34, the manufacturer can provide an end user with an appropriate external memory medium 46, and in certain cases a serial number or password, such that the end user can then configure the controller 34 themselves. In the case where a manufacturer supplies a distributor with a large number of controllers 34, the manufacturer can provide the distributor with exactly the same controller 34 regardless of whether the distributor wants some controllers 34 configured in a first way, and some controllers 34 configured in a second way. Instead, the manufacturer can provide the distributor with a number of identical controllers 34, and one or more external memory mediums 46 (and possibly serial numbers or passwords), that are suitable for configuring the controllers to acquire either a first configuration or a second configuration.

In the case where the controller 34 does not have pre-stored program instructions (as shown in FIG. 4B), the manner in which the controller 34 is caused to be configured is once again dependent on the type of configuration information 60 that is stored within the external memory medium 46. As mentioned above, in this embodiment, the configuration information 60 is in the form of one or more sets of program instructions that can be downloaded to the controller 34 for causing the controller 34 to acquire a given configuration. Each of the sets of program instructions stored within the external memory medium 46 will be associated with a respective different configuration.

In the case where the external memory medium 46 includes only a single set of program instructions, the processing unit 40 of the controller 34 is operative for executing a program element stored in the initial program instructions 62, for causing that set of program instructions to be downloaded to the controller 34 and stored within the memory 42. Once downloaded, the controller 34 can execute that set of program instructions, such that the controller 34 is configured in accordance with those program instructions.

In the case where the external memory medium 46 stores a plurality of sets of program instructions that are each associated with a respective different configuration, the manner in which the controller is configured is a bit different. More specifically, the configuration information 60 may be processed at least in part on the basis of additional information supplied to the processing unit 40 via the user control panel 32 of the bathing unit system 10. For example, and as described above with respect to step 514, a list of the different sets of program instructions can be displayed to a user via the control panel 32, or another external device that is different from the external memory medium 46. As such, a user may then select one of the sets of program instructions from the list. By selecting a set of program instructions from the list, that set of program instructions is then caused to be downloaded to the controller 34, such that it can be stored in the memory 42. Alternatively, each set of program instructions stored within the external memory medium 46 can be associated with a serial number, or a password. As such, once the external memory medium 46 has been connected to the controller 34 and the controller 34 has accessed the configuration information 60, then a human operator may enter a serial number, or a password, into the control panel 32 of the bathing unit system 10. By entering the serial number or password, the set of program instructions that is associated to that serial number or password is then caused to be downloaded to the controller 34, such that it can be stored in the memory 42. Once downloaded, the controller 34 can execute that set of program instructions, such that the controller 34 is configured in accordance with those program instructions.

In this manner, a manufacturer of the bathing unit controller 34 can manufacture a common controller 34, and then depending on the desired use of the controller 34, the manufacturer can provide the end user or distributor with an appropriate external memory medium 46, and in certain cases a serial number or password, such that the distributor or end user can then configure the controller 34.

In an alternative embodiment, the configuration information 60 may include a program element suitable that is suitable for being processed by the processing unit 40 of the controller 34 for causing certain hardware elements to be permanently or temporarily altered (i.e. paths burned, switches put in place, etc. . . . ) so as to configure the controller 34.

As described above, regardless of whether there are program instructions pre-stored within the memory unit 42 of the controller 34 (as shown in FIG. 4A), or whether the program instructions need to be downloaded to the controller 34 (as shown in FIG. 4B), the process that has been described above with respect to FIG. 4C is performed entirely by the controller 34 by executing the initial program instructions 62 stored in the memory unit 42 or in some circumstances, a program element that was stored on the external memory medium 46.

It should also be appreciated that the process that has been described above with respect to FIG. 4C can be performed by the controller 34 along with input that is received from a human operator via the control panel 32.

Given that all the processing required for accessing and configuring the controller 34 is performed at the controller 34, either independently, or in combination with instructions received through the control panel 32, there is no need for any processing to be done by the external memory medium 46. As such, the external memory medium 46 simply includes stored data, and in certain cases program elements, but does not have any processing capability built in.

As mentioned above, in certain circumstances, the external memory medium 46 may include an autoexec file such that once the controller 34 has accessed the configuration information 60, the processing unit 40 of the controller 34 executes the autoexec file stored on the external memory medium 46. The autoexec file can be operative for causing the processing unit 40 to download the configuration information 60, or determine which code or set of program instructions should be downloaded. In such an embodiment, it should be appreciated that although the external memory medium 46 does in fact include a program element, the processing functionality is still performed at the controller 34.

In accordance with a second non-limiting example of implementation, instead of configuring the controller 34 by configuring program instructions, the configuration information 60 contained in the external memory medium 46 is operative for configuring hardware within the controller. For example, the configuration information 60 may cause certain hardware to be activated that causes the controller 34 to acquire a certain configuration. For example, the hardware may be configured such that only bathing unit components connected to certain ones of the bathing unit component interfaces 58 can be controlled.

Diagnostic Information

Figure 5A:
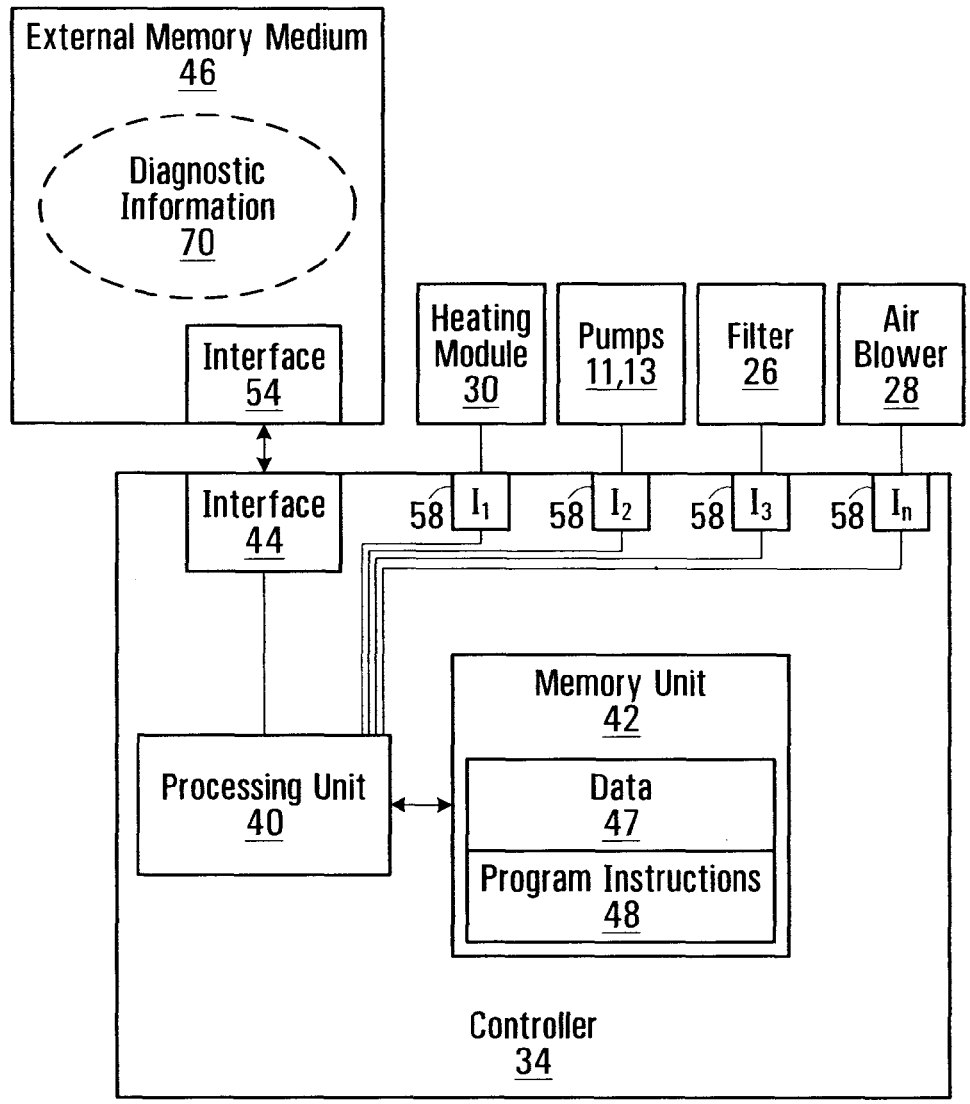
FIG. 5A shows a fourth non-limiting block diagram of a bathing unit controller and external memory medium in accordance with a fourth example of implementation of the present invention.

As shown in FIG. 5A, a further use for the external memory medium 46 is for receiving from the controller 34 diagnostic information associated with the operation of either the controller 34 or the set of bathing unit components 11, 13, 26, 28, 30.

Shown in FIG. 5A is a non-limiting block diagram of the controller 34 and an external memory medium 46 in accordance with the present invention. As described previously with relation to FIG. 3A, the controller 34 includes a processing unit 40, a memory unit 42 that stores data 47 and program instructions 48 and a plurality of bathing unit component interfaces 58 for enabling the controller to control the bathing unit components 11, 13, 26, 28, 30 and an interface 44 through which the controller 34 establishes a communication link with the external memory medium 46.

During operation of the bathing unit system 10, it is possible for errors and malfunctions to occur with the controller 34 or with one or more of the bathing unit components 11, 13, 26, 28, 30. It is often desirable to record the operational history of the bathing unit system 10 during its operation, so as to help a technician determine the source of such errors and malfunctions when they occur. In the past, when an error or malfunction occurred, the entire bathing unit controller 34 would need to be returned to the manufacturer or to a repair shop in order to determine what was wrong with the controller 34. Obviously, returning a controller 34 to the manufacturer or repair shop is both inconvenient and expensive to do.

In accordance with the present invention, and as shown in FIG. 5A, an external memory medium 46 can be connected to the controller 34 via interface 44, so as to establish a communication link between the controller 34 and the external memory medium 46. The controller 34 can then be caused to provide diagnostic information 70 associated with the operation of the controller 34 or the set of bathing unit components 11, 13, 26, 28, 30 to the external memory medium 46 over the communication link.

The diagnostic information 70 may include a variety of different types of data associated with the operation of the controller 34 and/or the set of bathing unit components 11, 13, 26, 28, 30. For example, the diagnostic information 70 may include the operational settings of all the bathing unit components 11, 13, 26, 28, 30 during start-up, the time stamps associated with different events that occur during the operation of the bathing unit components 11, 13, 26, 28, 30 (such as when the heating module is turned on, when it is turned off, etc.) and a history of various events that occur (such as lights being turned on, jets being activated, etc.) In addition, the diagnostic information could include information such as commands sent from the controller 34 to the bathing unit components 11, 13, 26, 28, 30, operational settings of the bathing unit components 11, 13, 26, 28, 30 over time, as well as inputs received from a control panel 32.

As will be described below, the controller 34 can store diagnostic information 70 associated with the functioning of the controller 34 and the bathing unit components 11, 13, 26, 28, 30 temporarily within the memory unit 42 such that it is later transferred to the external memory medium 46, or alternatively, the controller 34 can stored the diagnostic information 70 directly into the external memory medium 46.

In accordance with a first non-limiting embodiment, the controller 34 temporarily stores the diagnostic information 70 within the memory unit 42 of the controller 34. The diagnostic information that is stored within the memory unit 42 can then be provided (uploaded) to the external memory medium 46 upon receipt of instructions to upload the diagnostic information, or when a malfunction occurs with the controller 34 or with one or more of the bathing unit components 11, 13, 26, 28, 30. Alternatively, the diagnostic information can be periodically provided to the external memory medium 46 at predetermined time intervals (every few days or weeks).

In accordance with a second non-limiting embodiment, the external memory medium 46 may be connected to the controller 34 for a long period of time (i.e. days, weeks or months), such that the diagnostic information is transferred directly to the external memory medium 46. As such, the memory unit 42 does not continually record diagnostic information to its internal memory unit 42, and instead simply starts recording diagnostic information directly to the external memory medium 46 when the external memory medium 46 is connected to the controller 34 via interface 44. In certain circumstances where bugs/malfunctions are difficult to reproduce, it is advantageous to have the external memory medium 46 connected to the controller 34 for a long period of time, such that the diagnostic information is recorded to the external memory medium 46 when the malfunction happens.

Once the diagnostic information has been transferred to the external memory medium, instead of having to return the entire controller 34 to a manufacturer of the controller 34 when errors/malfunctions occur, a user/owner of the bathing unit system 10 can simply send the external memory medium 46 back to the manufacturer or repair center for analysis. Obviously, sending an external memory medium 46, such as a memory key or a CD, to a manufacturer, or sending the information that has been transferred to the external memory medium 46 to the manufacturer over the internet, is far easier than returning the entire bathing unit controller 34. By providing the diagnostic information associated to a given bathing unit controller 34 to a manufacturer, or maintenance provider, then it can be determined why a malfunction occurred, how a malfunction occurs over time, or how a new installation is performing over time.

Figure 5B:
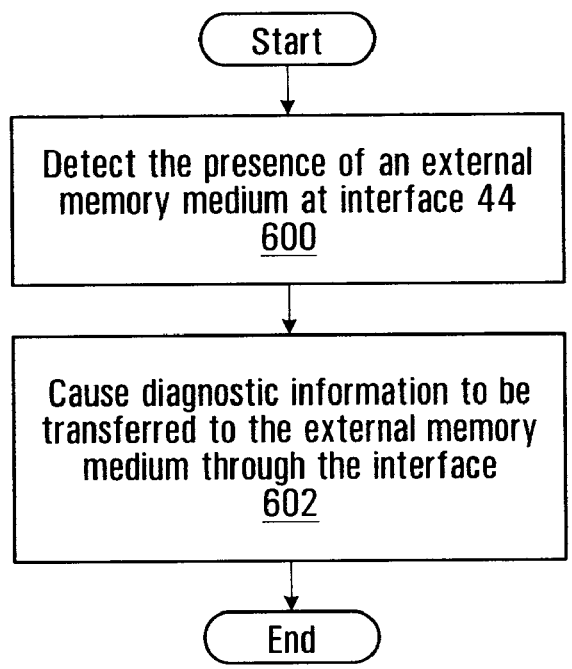
FIG. 5B shows a non limiting flow diagram of a process for providing diagnostic information to an external memory medium in accordance with a non-limiting example of implementation of the present invention.

The manner in which the diagnostic information 70 is transferred to the external memory medium 46 will now be described in more detail with respect to the flow chart shown in FIG. 5B.

In accordance with the present invention, the processing required for causing the diagnostic information to be uploaded to the external memory medium 46 is performed at the controller 34, either independently, or in combination with instructions received through the control panel 32. The program instructions required to perform this processing can be included within the program instructions 48 that are stored at the controller 34, or alternatively, some of the program instructions can be stored on the external memory medium 46 (such as in the case where the external memory medium 46 includes an autoexec file, to be executed by the processing unit 40 of the controller 34).

As such, the external memory medium 46 simply needs to be connected either directly, or indirectly, to the interface 44 of the controller 34, such that the controller 34 can cause diagnostic information to be uploaded thereto. This greatly simplifies the transferring procedure since a user/owner of the bathing unit system 10, or the manufacturer of the bathing unit system 10, simply needs to establish a communication link between the external memory medium 46 and the controller 34, in order to have the diagnostic information 70 transferred thereto.

Prior to commencing the transferring procedure, a communication link is established between the external memory medium 46 and the controller 34. In the case where the interfaces 44 and 54 are female and male USB connection ports respectively, the communication link is established by physically connecting the two portions of the USB connectors together. It should, however, be appreciated that in the case where the interfaces 44 and 54 are infrared ports, the communication link is established by bringing the two infrared ports into proximity of one another. Likewise, in the case where interfaces 44 and 54 are RF transceivers, the communication link is established by bringing the two transceivers within range of one another.

Once the communication link has been established, the first step 600 in the procedure, is to detect the presence of the external memory medium 46 at the interface 44.

In accordance with a first non-limiting embodiment, this detection may take place on the basis of instructions received from a user via the control panel 32. For example, once a user has caused the external memory medium 46 to be connected to the controller 34, the user can then use the control panel 32 in order to instruct the controller 34 to access the external memory medium 46 that is connected to the interface 44. On the basis of these instructions, the controller 34 will then detect the presence of the external memory medium 46.

In an alternative embodiment, the controller 34 may automatically detect the presence of the external memory medium 46 once the external memory medium 46 has been connected to the interface 44. For example, the interface 44 may include a physical or electronic sensor that detects the presence of the external memory medium 46 and then transmits a signal indicative of this presence to the processing unit 40 of the controller 34. In a further embodiment, the controller 34 may continually run a program module that periodically checks whether there is an external memory medium 46 connected at the interface 44.

Once the controller 34 has detected the presence of the external memory medium 46, at step 602, the controller 34 causes the diagnostic information to be transferred to the external memory medium 46 through the interface 44. This step can be performed in a variety of different manners, depending on whether the controller 34 is operative for pre-storing the diagnostic information within the internal memory unit 42, or whether the controller 34 is operative for storing the diagnostic information directly to the external memory medium 46 in real-time, as events happen.

In the case where the controller 34 is operative for pre-storing the diagnostic information within the memory unit 42, the controller 34 can cause all or part of the diagnostic information stored within the memory unit 42 to be uploaded to the external memory medium 46 on the basis of a variety of different factors. For example, all or part of the diagnostic information can be transferred to the external memory medium 46 whenever it is detected that a communication link has been established between the external memory medium 46 and the controller 34. Alternatively, all or part of the diagnostic information can be transferred to the external memory medium 46 on the basis of instructions to upload the diagnostic information received from a human operator via the control panel 32. In yet a further alternative, all or part of the diagnostic information can be transferred to the external memory medium 46 at predetermined time intervals (such as once a day or once a week) or whenever an error or malfunction occurs with the controller 34 or one or more of the bathing unit components 11, 13, 26, 28, 30.

The processing unit 40 may determine which parts, if not all, of the diagnostic information stored in memory unit 42 to transfer to the external memory medium 46 at least in part on the basis of an input from a user via the control panel 32.

In order to determine when to upload the diagnostic information to the external memory medium 34, the processing unit 40 of the controller 34 can access a program element stored in its program instructions 48. Based on execution of this program element, and possibly instructions received from a user via the control panel, the processing unit 40 can determine that diagnostic information should be transferred to the external memory medium 46 and cause the diagnostic information to be released to the external memory medium 46. In such an embodiment, the external memory medium 46 acts simply as a memory storage device, and does not include any executable program instructions or processing capability built in.

In an alternative embodiment, upon detection of the external memory medium 46 at the interface 44, the processing unit 40 can access a program element stored in the external memory medium 46. For example, the processing unit 40 may issue a signal to the external memory medium 46 for causing the program element, such as an autoexec file, to be released to the controller 34 through the interfaces 54 and 44. Once released, this program element can be executed at the controller 34, so as to cause the controller 34 to release diagnostic information associated with the operation of the set of bathing unit components to the external memory medium 46 for storage. In such an embodiment, it should be appreciated that although the external memory medium 46 does in fact include a program element, the processing functionality is still performed at the controller 34.

In the case where the controller 34 is operative for transferring the diagnostic information to the external memory medium 46 in real-time, as the events occur, then the controller 34 can cause the diagnostic information to be uploaded to the external memory medium 46 based on different triggers. For example, the controller 34 can start to record the diagnostic information to the external memory medium 46 as soon as a communication link has been established between the external memory medium 46 and the controller 34. Alternatively, the controller 34 can start to record the diagnostic information to the external memory medium 46 on the basis of instructions to upload the diagnostic information received from a human operator via the control panel 32.

The processing unit 40 of the controller 34 can start recording diagnostic information to the external memory medium 46, in real-time, on the basis of a program element stored in its program instructions 48, and possibly, on the basis of instructions received from a user via the control panel. In such an embodiment, the external memory medium 46 acts simply as a memory storage device, and does not include any executable program instructions or processing capability built in.

Alternatively, upon detection of the external memory medium 46 at the interface 44, the processing unit 40 can access a program element, such as an autoexec file, that is stored in the external memory medium 46 for causing the controller 34 to start recording the diagnostic information associated with the operation of the set of bathing unit components to the external memory medium 46. In such an embodiment, it should be appreciated that although the external memory medium 46 does in fact include a program element, the processing functionality is still performed at the controller 34.

In accordance with the present invention, all processing required for transferring or recording the diagnostic information to the external memory medium 46 is performed at the controller 34. The external memory medium 46 simply needs to be connected either directly, or indirectly, to the interface 44 of the controller 34, such that the controller 34 can cause the diagnostic information to be transferred, or recorded to the external memory medium 34.

Business Method

As mentioned throughout the application, the processing that is done in order to either update or configure a controller 34 based on information stored on an external memory medium 46 is done entirely at the controller 34. This processing can be done on the basis of program logic stored at the controller 34 or basis of program logic stored at the external memory medium 46, but the processing itself is done at the controller 34. This processing can be done entirely by the controller 34, or can be done at least in part on the basis of instructions received from a human operator via a control panel 32 or an external device other than the external memory medium 46, such as a PDA, a computer hard-drive or a cell phone, among other possibilities.

Given that the processing is performed entirely at the controller 34, it can be appreciated that by simply providing a user, owner or distributor of the bathing unit system 10 with an external memory medium 46 containing the appropriate information (i.e. either update information or configuration information) the controller 34 can be easily updated and/or configured by the user, owner or distributor.

Figure 6:
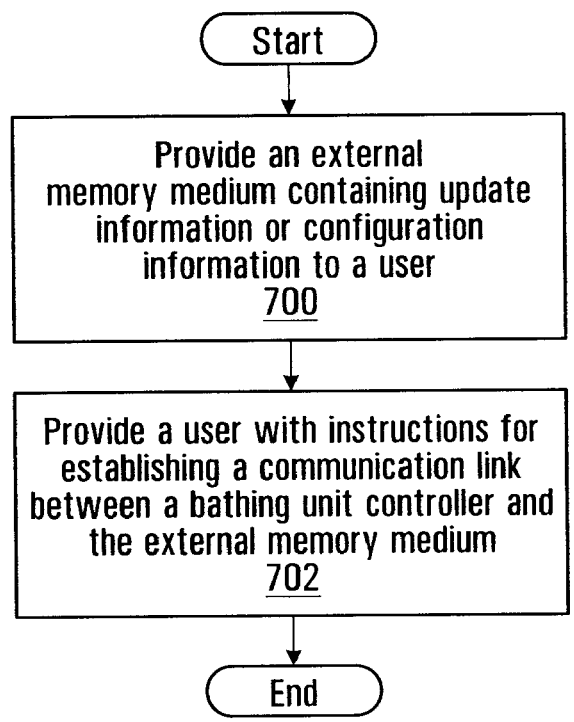
FIG. 6 shows a non-limiting flow diagram of a process for enabling a user/owner of a bathing unit system to configure their bathing unit system in accordance with a non-limiting example of implementation of the present invention.

Shown in FIG. 6 is a non-limiting example of a method for enabling a user, owner or distributor (hereafter to be referred to as the user) of a bathing unit system 10 to update and/or configure a bathing unit controller 34. Firstly, at step 700, the method involves providing the user of the bathing unit system 10 with an external memory medium 46 that includes the relevancy information 50/update information 52, described with respect to FIG. 3A and/or the configuration information 60, described with respect to FIGS. 4A and 4B.

Figure 7:
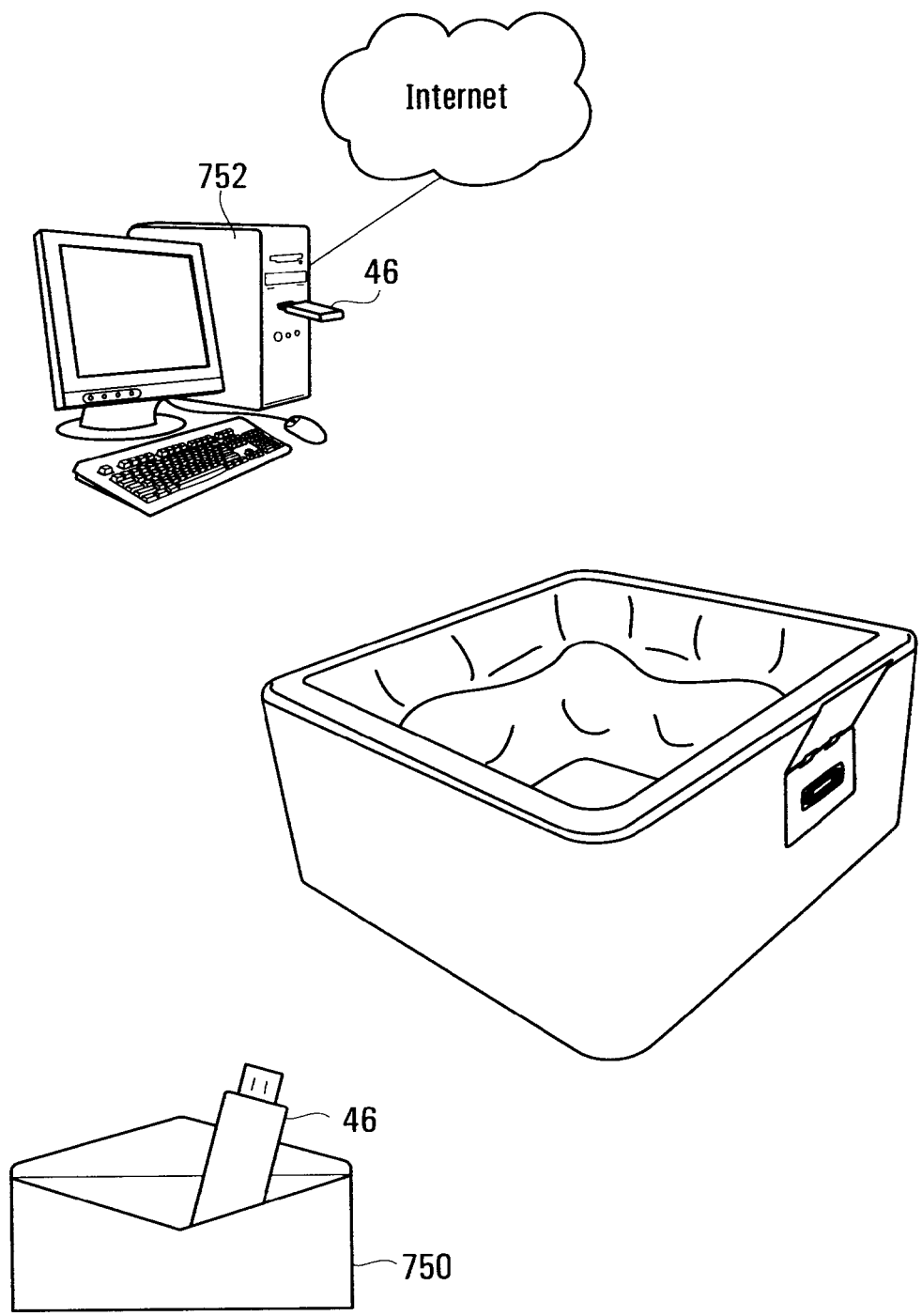
FIG. 7 shows a representational diagram of a bathing unit system and different external memory mediums in accordance with a non-limiting example of implementation of the present invention.

The manner in which the user is provided with an external memory medium 46 that includes this relevancy information 50/update information 52 and/or configuration information 60 can be done in a variety of different ways. For example, in the case where the external memory medium 46 is a memory stick, a CD or a DVD that includes the above described information, then the external memory medium 46 can be provided to a user directly by the manufacturer with the purchase the bathing unit controller 34, or via regular snail mail or a courier service, among other possibilities. Alternatively, the user may not be provided with the actual physical medium, and may instead be instructed to log onto a website, via the internet, for downloading the relevancy information 50/update information 52 and/or the configuration information 60. The user can then save this relevancy information 50/update information 52 and/or configuration information 60 to the computer's hard drive, to a disk, CD, DVD, PDA, cell phone, smart phone, or to a memory stick, among other possibilities. Each of these memory mediums can be considered to be an external memory medium as used herein. FIG. 7 shows a depiction of an external memory medium 46 being sent by mail in an envelope 750, and an external memory medium 46 attached to a computer hard-drive 752 for receiving downloaded relevancy information 50/update information 52 and/or configuration information 60. It should be appreciated that the computer hard-drive 752 itself could also be considered the external memory medium 46.

It should be appreciated that the user of the bathing unit system 10 may be provided with the external memory medium 46 containing the above described information in response to a variety of circumstances. For example, an external memory medium 46 containing the relevancy information 50 and update information 52 and/or configuration information 60 can be provided to the user on the basis of a request from a user. The request may be initiated via a phone call, a written request, an email request or via a request entered at a website, such that the external memory medium 46 can be mailed or sent by courier to the user. Alternatively, in the case where the user is able to download the relevancy information 50/the update information 52 and/or the configuration information 60 from a website, the request may simply come as a result of clicking on certain buttons on the website.

Alternatively, the external memory medium may not be provided to a user on the basis of a request. Instead, an external memory medium containing relevancy information 50/update information 52 and/or configuration information 60 may be provided to a plurality of users whenever a manufacturer has made an update, or detected a defect in the existing program instructions running on most bathing unit controllers 34. In such a scenario, the manufacturer may have a list of bathing unit system 10 users such that the manufacturer can mass mail an external memory medium 46 containing the appropriate information to each party in that list. Alternatively, this can be done by sending an email to the list of users advising them to download the latest update or configuration. In yet a further alternative, an advisory could be posted on the manufacturer's website advising bathing unit system 10 users that log onto the website to download the latest update or configuration.

Referring back to FIG. 6, at step 702, the method involves providing the user of the bathing unit system 10 with instructions for enabling the user to establish a communication link between the external memory medium 46 and the controller 34 such that the process described above with respect to one of FIGS. 3B and 4C can be executed.

This step of providing instructions can be done in a variety of different manners. For example, in the case where the external memory medium is provided to the user via mail or courier, the instructions may be provided to the user via a printed handout that includes written instructions or diagrams, either on paper or via an interactive CD for example. These instructions may provide information on where the controller 34 is located, and where interface 44 is located on the controller 34. Alternatively, in the case where the user downloads the relevancy information 50 and update information 52 and/or configuration information 60 from a website, then the instructions may be provided via an on-line tutorial that can be accessed from the website. The on-line tutorial may be a video tutorial or an audio tutorial, among other possibilities.

As described above, once the actual communication link has been established between the external memory medium 46 and the controller 34, the controller 34 takes over the updating procedure without any further interaction from a user/owner of the bathing unit system.

Business Method for Diagnostic Procedure

Given that the processing involved in transferring or recording diagnostic information to the external memory medium 46 is performed almost entirely at the controller 34, it can be appreciated that this can be very simply done by providing a user of the bathing unit system 10 with an external memory medium 46 and instructing the user how to establish the communication link between the controller 34 and the external memory medium 46. The user can then easily cause the diagnostic information 70 from the controller 34 to be recorded to the external memory medium 46, such that the information can then be forwarded to a manufacturer of the bathing unit controller 34 either by mail, courier or the internet. In this manner, the hassle of having to provide the manufacturer with the entire bathing unit controller 34, when something malfunctions, is avoided.

The external memory medium 46 may belong to a user of the bathing unit system 10, or may be a specialized external memory medium 46 supplied to the user of the bathing unit system 10 by the manufacturer of the bathing unit controller 34. The user is also provided with instructions as to how to establish a communication link between the external memory medium 46 and the controller 34. This may be done by providing written instructions or diagrams, either on paper or via an interactive CD for example. Alternatively, these instructions can be located on a sticker that has been positioned in close proximity to where the controller is located, and where interface 44 is located on the controller 34. In yet a further alternative, the instructions may be provided via an on-line tutorial that can be accessed from the manufacturer's website. The on-line tutorial may be a video tutorial or an audio tutorial, among other possibilities.

Once the actual communication link has been established between the external memory medium 46 and the controller 34, the controller 34 is able to start transferring the diagnostic information to the external memory medium 46 with limited, if any, further interaction required from a user of the bathing unit system 10. Once the diagnostic information has been transferred or recorded to the external memory medium 46, then the external memory medium can be mailed or couriered to the manufacturer such that they can determine what is wrong with the bathing unit controller 34 or the components 11, 13, 26, 28, 30. Alternatively, the information from the external memory medium 46 can be uploaded to the Internet such that it can be sent electronically to the manufacturer.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. A controller for a bathing unit system, said controller comprising:
   a) a memory unit storing program code implementing a set of bathing unit configurations, said set of bathing unit configurations including at least a first bathing unit configuration and a second bathing unit configuration;
   b) a communication interface for communicating with external devices;
   c) a processing unit in communication with said communication interface, said processing unit being programmed for:
      i) accessing an external memory medium through said communication interface to detect if configuration information is stored on the external memory medium;
      ii) in response to detection of configuration information stored on the external memory medium:
         (1) unlocking a specific bathing unit configuration from the set of bathing unit configurations implemented by the program code stored in the memory unit of the controller at least in part by processing the detected configuration information; and
         (2) operating the bathing unit system in accordance with the unlocked specific bathing unit configuration implemented by the program code stored in the memory unit of the controller.

2. A controller as defined in claim 1, wherein the processing unit is programmed for unlocking the specific bathing unit configuration at least in part by processing the configuration information detected on the external memory medium to unlock a portion of the program code stored on the memory unit of the controller, where the unlocked portion of the program code implements the specific bathing unit configuration.

3. A controller as defined in claim 1, wherein said processing unit is programmed for:
   a) operating a first set of bathing unit components when the first bathing unit configuration in the set of bathing unit configurations is unlocked; and
   b) operating a second set of bathing unit components when the second bathing unit configuration in the set of bathing unit configurations is unlocked.

4. A controller as defined in claim 3, wherein said second set of bathing unit components is a subset of said first set of bathing unit components.

5. A controller as defined in claim 3, wherein said second set of bathing unit components includes at least one bathing unit component absent from said first set of bathing unit components.

6. A controller as defined in claim 1, wherein said bathing unit system includes a pump, wherein said processing unit is programmed for:
   a) controlling operational settings associated with the pump in a first manner when the first bathing unit configuration in the set of bathing unit configurations is unlocked; and
   b) controlling operational settings associated with the pump in a second manner different from the first manner when the second bathing unit configuration in the set of bathing unit configurations is unlocked.

7. A controller as defined in claim 1, wherein said bathing unit system includes a bathing unit component selected from the set consisting of a pump, a water heater and a water filtration module, wherein said processing unit is programmed for:
   a) controlling operational settings associated with the bathing unit component in a first manner when the first bathing unit configuration in the set of bathing unit configurations is unlocked; and
   b) controlling operational settings associated with the bathing unit component in a second manner different from the first manner when the second bathing unit configuration in the set of bathing unit configurations is unlocked.

8. A controller as defined in claim 1, wherein the detected configuration information stored on the external memory medium includes an access code associated with the specific bathing unit configuration in the set of bathing unit configurations.

9. A controller as defined in claim 1, wherein the detected configuration information stored on the external memory medium includes a program element suitable for being processed by the processing unit of the controller for causing the specific bathing unit configuration in the set of bathing unit configurations to be unlocked.

10. A controller as defined in claim 1, wherein said processing unit is programmed for unlocking the specific bathing unit configuration at least in part by processing:
    (1) the configuration information detected on the external memory medium; and
    (2) a user input.

11. A controller as defined in claim 10, wherein said user input includes one of a serial number and a password.

12. A controller as defined in claim 1, wherein said communication link is a wireless link.

13. A controller as defined in claim 1, wherein said communication interface includes a USB port.

14. A bathing unit system, comprising:
    a) a set of bathing unit components including a water heater and a pump; and
    b) a controller comprising:
       i) a memory unit storing program code implementing a set of bathing unit configurations, said set of bathing unit configurations including at least a first bathing unit configuration and a second bathing unit configuration;
       ii) a communication interface for communicating with external devices;
       iii) a processing unit in communication with said interface, said processing unit being programmed for:
          (1) accessing an external memory medium through said communication interface to detect if configuration information is stored on the external memory medium;
          (2) in response to detection of configuration information stored on the external memory medium:
             (a) unlocking a specific bathing unit configuration from the set of bathing unit configurations implemented by the program code stored in the memory unit of the controller at least in part by processing the detected configuration information; and
             (b) operating the set of bathing unit components in accordance with the unlocked specific bathing unit configuration implemented by the program code stored in the memory unit of the controller.

15. A bathing unit system as defined in claim 14, wherein the processing unit is programmed for unlocking the specific bathing unit configuration at least in part by processing the configuration information detected on the external memory medium to unlock a portion of the program code stored on the memory unit of the controller, where the unlocked portion of the program code implements the specific bathing unit configuration.

16. A bathing unit system as defined in claim 15, wherein said processing unit is programmed for:
   a) controlling operational settings associated with the pump in a first manner when the first bathing unit configuration in the set of bathing unit configurations is unlocked; and
   b) controlling operational settings associated with the pump in a second manner different from the first manner when the second bathing unit configuration in the set of bathing unit configurations is unlocked.

17. A bathing unit system as defined in claim 14, wherein said processing unit is programmed for unlocking the specific bathing unit configuration at least in part by processing:
   (1) the configuration information detected on the external memory medium; and
   (2) a user input.

18. A bathing unit system as defined in claim 17, wherein said user input includes one of a serial number and a password.

19. A bathing unit system as defined in claim 14, wherein said communication link is a wireless link.

20. A bathing unit system as defined in claim 14, wherein said communication interface includes a USB port configured for engaging a complementary interface associated with the external memory medium.

21. A bathing unit system as defined in claim 14, wherein said processing unit is programmed for:
   a) operating a first sub-set of the set of bathing unit components when the first bathing unit configuration in the set of bathing unit configurations is unlocked; and
   b) operating a second sub-set of the set of bathing unit components when the second bathing unit configuration in the set of bathing unit configurations is unlocked.

22. A bathing unit system as defined in claim 21, wherein said second sub-set of bathing unit components includes at least one bathing unit component absent from said first sub-set of bathing unit components.

23. A bathing unit system as defined in claim 14, wherein said processing unit is programmed for:
   a) controlling operational settings associated with bathing unit components in the set of bathing unit components in a first manner when the first bathing unit configuration in the set of bathing unit configurations is unlocked; and
   b) controlling operational settings associated with bathing unit components in the set of bathing unit components in a second manner different from the first manner when the second bathing unit configuration in the set of bathing unit configurations is unlocked.

24. A bathing unit system as defined in claim 14, wherein the detected configuration information stored on the external memory medium includes an access code associated with the specific bathing unit configuration in the set of bathing unit configurations.

25. A bathing unit system as defined in claim 14, wherein the detected configuration information stored on the external memory medium includes a program element suitable for being processed by the processing unit of the controller for causing the specific bathing unit configuration in the set of bathing unit configurations to be unlocked.

26. An auxiliary device suitable for use with a controller of a bathing unit system, the controller comprising a memory unit that stores program code implementing a set of bathing unit configurations, said set of bathing unit configurations including at least two bathing unit configurations, said auxiliary device comprising:
   a) a communication interface for communicating with external devices;
   b) a memory medium storing configuration information, said configuration information being associated with a specific bathing unit configuration from the set of bathing unit configurations implemented by the program code stored in the memory unit of the controller;
   c) in use, the auxiliary device communicating the configuration information to the controller of the bathing unit system over the communication interface for processing by the controller to unlock the specific bathing unit configuration from the set of bathing unit configurations implemented by the program code stored in the memory unit of the controller.

27. An auxiliary device as defined in claim 16, wherein the configuration information stored on the memory medium includes an access code associated with the specific bathing unit configuration in the set of bathing unit configurations.

28. An auxiliary device as defined in claim 26, wherein the configuration information stored on the memory medium includes a program element for processing by the controller to unlock the specific bathing unit configuration from the set of bathing unit configurations implemented by the program code stored in the memory unit of the controller.

29. An auxiliary device as defined in claim 26, wherein said communication interface includes a USB port.

30. A method for configuring a controller for a bathing unit system, said method comprising:
   a) providing a controller having:
      i) a memory unit storing program code implementing a set of bathing unit configurations, said set of bathing unit configurations including at least two bathing unit configurations;
      ii) a communication interface for communicating with external devices; and
      iii) a processing unit in communication with said interface;
   b) using the processing unit of the controller to access an external memory medium through said communication interface to detect if configuration information is stored on the external memory medium;
   c) in response to detection by the processing unit of the controller of configuration information stored on the external memory medium:
      i) using the processing unit to unlock a specific bathing unit configuration from the set of bathing unit configurations implemented by the program code stored in the memory unit of the controller at least in part by processing the detected configuration information; and
      ii) using the processing unit to operate the bathing unit system in accordance with the unlocked specific bathing unit configuration.

* * * * *

UNITED STATES PATENT AND TRADEMARK OFFICE
CERTIFICATE OF CORRECTION

| | | |
|---|---|---|
| PATENT NO. | : 8,150,552 B2 | |
| APPLICATION NO. | : 12/528256 | |
| DATED | : April 3, 2012 | |
| INVENTOR(S) | : Christian Brochu and Mathieu Robitaille | |

It is certified that error appears in the above-identified patent and that said Letters Patent is hereby corrected as shown below:

1) Item 75, The first name of the second inventor is misspelled on the first page of the patent. The second inventor's name should read as follows:

Mathieu ROBITAILLE, not Mathleu ROBITAILLE.

2) Col. 34, line 21, Claim 27 should be corrected as follows:

"An auxiliary device as defined in ~~claim 16~~<u>claim 26,</u> wherein..."

Signed and Sealed this
Ninth Day of October, 2012

David J. Kappos
*Director of the United States Patent and Trademark Office*